(12) United States Patent
Adachi

(10) Patent No.: US 6,256,334 B1
(45) Date of Patent: Jul. 3, 2001

(54) BASE STATION APPARATUS FOR RADIOCOMMUNICATION NETWORK, METHOD OF CONTROLLING COMMUNICATION ACROSS RADIOCOMMUNICATION NETWORK, RADIOCOMMUNICATION NETWORK SYSTEM, AND RADIO TERMINAL APPARATUS

(75) Inventor: Hideo Adachi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/935,255

(22) Filed: Sep. 22, 1997

(30) Foreign Application Priority Data

Mar. 18, 1997 (JP) .................................................. 9-064970

(51) Int. Cl.[7] ................................................ H04L 27/30
(52) U.S. Cl. ......................... 375/132; 375/130; 375/136; 375/138; 370/252; 370/310
(58) Field of Search ................................ 375/219, 132, 375/134, 130, 136, 138; 370/319, 328, 330, 338, 343, 344, 480, 310, 252

(56) References Cited

U.S. PATENT DOCUMENTS

| | | | |
|---|---|---|---|
| 4,850,036 | * 7/1989 | Smith | 455/502 |
| 5,394,433 | * 2/1995 | Bantz et al. | 375/202 |
| 5,425,049 | * 6/1995 | Dent | 375/202 |
| 5,533,025 | * 7/1996 | Fleek et al. | 370/445 |
| 5,781,536 | * 7/1998 | Ahmadi et al. | 370/252 |
| 5,784,368 | * 7/1998 | Weigand et al. | 370/310 |
| 5,822,361 | * 10/1998 | Nakamura et al. | 375/202 |
| 5,862,142 | * 1/1999 | Takiyasu et al. | 370/480 |

FOREIGN PATENT DOCUMENTS 7-15443   1/1995   (JP) .

\* cited by examiner

Primary Examiner—Stephen Chin
Assistant Examiner—Shuwang Liu
(74) Attorney, Agent, or Firm—Armstrong, Westerman, Hattori, McLeland & Naughton, LLP

(57) ABSTRACT

A base station apparatus for a radiocommunication network in which radiocommunication with one or more radio terminal apparatuses is established according to a frequency hopping scheme. The base station apparatus includes a search section which searches for another radiocommunication network in the vicinity of the base station apparatus when the base station apparatus is started, and when another radiocommunication network is detected, obtains the pattern and time of frequency hopping in another radiocommunication network. A frequency hopping selection/setting section selects the pattern obtained by the search section as the frequency hopping pattern for the base station apparatus, and selects, on the basis of the time obtained by the search section, timing at which the frequency hopping based on the pattern does not cause frequency interference with respect to frequency hopping performed in another radiocommunication network, and carries out frequency hopping of the pattern at the thus-selected timing. It becomes possible to improve the throughput of the network system such as a radio LAN.

4 Claims, 14 Drawing Sheets

BASE STATION APPARATUS FOR RADIOCOMMUNICATION NETWORK, METHOD OF CONTROLLING COMMUNICATION ACROSS RADIOCOMMUNICATION NETWORK, RADIOCOMMUNICATION NETWORK SYSTEM, AND RADIO TERMINAL APPARATUS

BACKGROUND OF THE INVENTION

1) Field of the Invention

The present invention relates to a base station apparatus for a radiocommunication network, a method of controlling communication across a radiocommunication network, a radiocommunication network system, and a radio terminal apparatus, all of which are suitable for use in a radio LAN (Local Area Network).

2) Description of the Related Art

FIG. 12 is a block diagram illustrating a communications system to which a radio LAN is applied. In the communications system illustrated in FIG. 12, two radio base stations 10A and 101B connected to a cable network 104 constitute radio LANs (radiocommunication networks) 100A and 100B, respectively.

These radio LANs 100A and 100B are systems, each of which connects a plurality of radio terminals (terminal stations) 102 to the network without a cable. These radio base stations 101A and 101B control a plurality of radio terminals 102 existing in each of radio areas 103A, 103B by periodically sending synchronous frame signals called beacon signals. In short, the range to which beacon signals propagate can be defined as each of the radio areas 103A, 103B of the radio LANs 100A, 100B.

Accordingly, the radio terminal 102 in either the radio area 103A or 103B is capable of establishing communication with a cable terminal 105 connected to the cable network 104 or with another radio terminal 102 existing in either the radio area 103B or 103A, via the radio base station 101A or 101B.

A spread spectrum (hereinafter abbreviated as SS) scheme Is employed for a radiocommunication scheme used for the previously-described medium-speed radio LAN. In contrast to a scheme which employs specifically-limited ordinary frequency bands, the SS scheme utilizes a much wider signal band. In the SS scheme, when a certain frequency is considered, communication is established at an output as low as the level of noise.

As illustrated in FIG. 13, according to the SS scheme, a train of input pulses is subjected to a narrow bandwidth modulation (i.e., primary modulation), and the thus-modulated signal is subjected to spread modulation (i.e., secondary modulation), so as to intentionally spread the spectrum of the signal. The signal subjected to spread modulation is then transmitted. Compared with the original narrow-band modulated signal, the signal having a spread spectrum has a high degree of redundancy and has high resistance to noise or fading. On a receiving side, a received signal is subjected to secondary demodulation (spread demodulation), and the signal is further subjected to primary demodulation, whereby a train of output pulses is obtained.

The SS scheme is further classified into a direct sequence (hereinafter abbreviated as DS) scheme and a frequency-hopping (hereinafter abbreviated as FH) scheme. The DS scheme is a scheme in which information is subjected to secondary modulation through use of a train of noise-like pulses which is much faster than a train of input pulses encoded from information to be transmitted. The FH scheme is a scheme in which a frequency band having a predetermined width is divided into a plurality of channels, and the plurality of channels are switched one after another so as to be sequentially used in the form of a predetermined pattern (i.e., an FH pattern) as a carrier frequency of an ordinary narrow-band modulated signal. Both the DS and FH schemes are intended to allow many users to effectively use a frequency band by distributing the frequency band of the carrier wave so as to reduce transmission time to as short a period as possible.

The previously-described radio LAN employs the FH scheme. When the radio LANs 100A and 100B previously described with reference to FIG. 12 carry out communication according to the FH scheme, the radio base stations 101A and 101B in the respective radio LANs 100A and 100B notify the radio terminals 102 in the radio areas 103A and 103B of FH patterns used in the radio areas 103A and 103B by means of the foregoing beacon signals.

If an FH scheme network is solely present, the network provides the throughput performance inherent therein without radio interference unless another piece of apparatus which sends radio waves at the same frequency band is present in the vicinity of the network. However, if there is another radio LAN system in the vicinity of the network (for example, 10 there are overlapping areas among a plurality of radio areas 103A to 103C as illustrated In FIG. 14), the same frequency band is used in these radio areas. Consequently, there may be cases where the same frequency is used at the same time or where adjacent frequencies are used, the throughput of the networks is deteriorated by radio interference between the networks. As the number of peripheral networks increases, the degree of interference increases, which in turn results in an increase in the rate of deterioration of the throughput. In FIG. 14, 100C designates a radio LAN, and 101C designates a radio base station used in the radio LAN 100C. 103C designates a radio area of the radio base station 101C.

In Japan there are 23 channels in a frequency band which can be used for the foregoing LAN system. With the FH scheme, an operation is repeated in such a way that the 23 channels are sequentially switched one after another in accordance with a predetermined FH pattern. Accordingly, during the course of one round of hopping among 23 channels in accordance with the predetermined FH pattern, if there is present a radio wave having a frequency that interferes with the frequency band, interference occurs once at a frequency that coincides with the frequency of the interference radio wave and occurs twice at frequencies adjacent to the frequency of the interference radio wave.

If interference occurs at a frequency that coincides with the frequency of the interference radio wave (i.e., when the frequency used for the FH scheme matches with the frequency of the interference radio wave), communication can be established by evenly using that frequency band. However, in the case where interference occurs at the adjacent frequencies (i.e., when the frequency used for the FH scheme is adjacent to the frequency of the interference radio wave), such interference cannot be avoided. If there is another radio station which may cause radio interference in the vicinity of a radio station, the communication performance of the radio station decreases by a maximum of 2.5/23=10.8%. For example, if there are five radio stations which may cause radio interference in the vicinity of the radio station, there will be a maximum reduction of 12.5/23=54% in the communication performance of the radio station.

To prevent such a problem, if there are a plurality of networks in the radio LAN system that employs the FH scheme, instead of avoiding the radio interference, there is used a hopping pattern which prevents uneven occurrence of frequency interference, assuming that frequency interference occurs at a certain probability. According to the technique disclosed in, e.g., Japanese Patent Application Laid-Open (Kokai) No. 7-15443, if a certain radio station carries out communication through use of a predetermined FH pattern and if there are networks which use the same FH pattern in the vicinity of that radio station, the radio station prevents frequency interference through using another FH pattern instead of the original FH pattern. However, even if a different FH pattern is used, there is a sufficient risk of interference being caused when the frequency used for the FH scheme matches with the frequency used in the other network or when the frequency used for the FH scheme is located adjacent to the frequency used in the other network. Therefore, it is impossible to ensure prevention of radio interference.

In contrast, the transmission-line performance of the radio LAN is usually about 1–2 Mbps (about $\frac{1}{10}$ to $\frac{1}{5}$ that of existing cable LANs). Accordingly, if a plurality of radio terminals concentrate at one radio station, there arises the imbalance of load between the base stations having a large number of radio terminals connected thereto and base stations having a smaller number of radio terminals connected thereto. There is a significant difference in performance between the radio terminals used in the same area.

CSMA/CA (Carrier Sense Multiple Access/Collision Avoid)-with-acknowledgment scheme of a MAC (Media Access Control) layer protocol used for radio LAN is analogous to a CSMA/CD (Carrier Sense Multiple Access/Collision Detect) scheme which has come into widespread use for existing cable LANs. However, they are different from each other in the following two points.

First, in the radio LAN, a control frame (a synchronization frame signal) is sent from the radio station at constant intervals, and each of the radio terminals also sends the control frame at irregular intervals, thereby hindering the transmission of an ordinary data frame.

Second, in the radio LAN, collision cannot be detected definitely. Therefore, the following procedure is performed in order to confirm transmission of a frame. The receiving side sends an acknowledgment signal back to the sending side, and the sending side receives the acknowledgment signal in order to confirm that a frame has been correctly received. Therefore, the transmitting side cannot acknowledge the completion of transmission of a frame without collision until it receives an acknowledgment from the receiving side.

In order to determine at an early time collision between (or nonarrival of) data, or in order to ensure the period of time during which a transmission path is occupied, RTS (Request-to-send) and CTS (Clear-to-send) control frames are exchanged between the transmitting side and the receiving side before data transmission. However, if the RTS and CTS frame control signals are exchanged in a state where there is a slight load on a transmission path and there are a small number of collisions, sending one frame of data takes a longer period of time.

Such a complicated protocol is apt to increase the difference in effective throughput between the radio LANs and the cable LANs. Therefore, in some network applications, when the radio LAN is used with these applications, users feel that the response is noticeably bad.

SUMMARY OF THE INVENTION

The present invention has been conceived in view of the foregoing drawbacks, and an object of the present. invention is to provide a base station apparatus for radiocommunication purposes, a method of controlling communication across a radiocommunication network, a radiocommunication network system, and radio terminal apparatuses, all of which improve the throughput of a network system such as a radio LAN.

To these ends, according to one aspect of the present invention, there is provided a base station apparatus for radiocommunication in which radiocommunication with one or more radio terminal apparatuses is established according to a frequency hopping scheme, the base station apparatus comprising: a search section which searches for another radiocommunication network in the vicinity of the base station apparatus when the base station apparatus is started, when another radiocommunication network is detected, the searching section obtaining the pattern and time of frequency hopping in the radiocommunication network; and a frequency hopping selection/setting section which selects the pattern obtained by the search section as the frequency hopping pattern for the base station apparatus, and which selects, on the basis of the time obtained by the search section, timing at which the frequency hopping based on the pattern does not cause frequency interference with respect to frequency hopping performed in another radiocommunication network, and which carries out frequency hopping of the pattern at the thus-selected timing.

The base station apparatus may be provided with a timing adjustment section which, during the course of ordinary operation, adjusts the timing of the frequency hopping of the base station apparatus relative to the frequency hopping in another communications network.

According to another aspect of the present invention, there is provided a method of controlling communication across a radiocommunication network applied to a radiocommunication network which comprises one or more radio terminal apparatuses and a base station apparatus which establishes communication with the radio terminal apparatuses according to a frequency hopping scheme, wherein the base station apparatus searches for another radiocommunication network in the vicinity of the base station apparatus when the base station apparatus is started; and when another radiocommunication network is detected, the base station apparatus obtains the pattern and time of frequency hopping in the radiocommunication network, selects the pattern as the frequency hopping pattern for the base station apparatus, selects, on the basis of the time obtained by the search section, timing at which the frequency hopping based on the pattern does not cause frequency interference with respect to frequency hopping in another radiocommunication network, and executes frequency hopping of the pattern at the thus-selected timing. The base station apparatus may, during the course of ordinary operation, adjusts the timing of the frequency hopping of the base station apparatus relative to the frequency hopping performed in another communications network.

As a result, if another radiocommunication network is detected in the vicinity of the base station apparatus, there is employed a pattern which is completely the same as that of frequency hopping performed in that radiocommunication network, and frequency hopping is carried out at a timing at which no frequency interference arises. That is, frequency hopping operations having completely the same pattern are executed such that an appropriate difference (timing difference) is provided. Therefore, it is possible to actively avoid frequency interference between the frequency hopping of the radiocommunication network of the base station apparatus and the frequency hopping of another radiocommunication network.

Further, there may be a case where, due to variations with time associated with the operation of the radiocommunication network over a long period of time, there is an increase in the risk of frequency interference as a result of a gradual decrease in the timing difference between the frequency hopping of the radiocommunication network of the base station apparatus and the frequency hopping of another radiocommunication network. The frequency interference due to such variations with time can be avoided by adjusting the timing of the frequency hopping of the base station apparatus relative to the frequency hopping of another radiocommunication network.

According to still another aspect of the present invention, there is provided a radiocommunication network system including a plurality of base station apparatuses which have adjacent or overlapping radio areas, and one or more radio terminal apparatuses which establish communication with any one of the base station apparatuses, wherein each of the base station apparatuses has a load-condition transmission section which sends the state of load on each base station apparatus to the radio terminal apparatus in the form of a probe response signal when receiving a probe signal from the radio terminal apparatus; and the radio terminal apparatus has a throughput storage section which stores previously-imparted necessary throughput as information; a probe signal transmission section which sends a probe signal to search for a base station apparatus in the vicinity of the radio terminal apparatus; and a base station apparatus selection section which selects a base station apparatus whose load state is optimum on the basis of a load-state signal having been sent back from the base station apparatus in response to the probe signal transmitted from the probe signal transmission section as well as on the basis of the throughput stored in the throughput storage section, and which connects the thus-selected base station apparatus to the radio terminal apparatus.

In this case, if the state of load on the base station apparatus connected to the radio terminal apparatus has changed to an unsuitable throughput state stored in the throughput storage section, the base station selection section may select another base station apparatus whose load state is optimum on the basis of the load-state signal sent back from the base station apparatus in response to the probe signal transmitted from the probe signal transmission section as well as on the basis of the throughput stored in the throughput storage section, and may connect the thus-selected base station apparatus to the radio terminal apparatus.

The radio terminal apparatus of the present invention establishes communication with any one of a plurality of base station apparatuses which have adjacent or overlapping radio areas. The radio terminal apparatus has a throughput storage section which stores previously-imparted necessary throughput as information; a probe signal transmission section which sends a probe signal to search for a base station apparatus in the vicinity of the radio terminal apparatus; and a base station apparatus selection section which selects a base station apparatus whose load state is optimum on the basis of a load-state signal having been sent back from the base station apparatus in response to the probe signal transmitted from the probe signal transmission section as well as on the basis of the throughput stored in the through-put storage section, and which connects the thus-selected base station apparatus to the radio terminal apparatus.

In this case, if the state of load on the base station apparatus connected to the radio terminal apparatus has changed to an unsuitable throughput state stored in the throughput storage section, the base station selection section may select another base station apparatus whose load state is optimum on the basis of the load-state signal sent back from the base station apparatus in response to the probe signal transmitted from the probe signal transmission section as well as on the basis of the throughput stored in the throughput storage section, and may connect the thus-selected base station apparatus to the radio terminal apparatus.

According to a further aspect of the present invention, there is provided a method of controlling communication across a radiocommunication network applied to a radiocommunication network which comprises a plurality of base station apparatuses which have adjacent or overlapping radio areas, and one or more radio terminal apparatuses which establish communication with any one of the base station apparatuses, the method comprising the steps of: previously imparting necessary throughput to the radio terminal apparatus; sending a probe signal from the radio terminal apparatus in order to search for a base station apparatus in the vicinity of the radio terminal apparatus; sending the state of load to the radio terminal apparatus from the base station apparatus that received the probe signal; and selecting the base station apparatus whose load state is optimum on the basis of a load-state signal having been sent back from the base station apparatus as well as on the basis of the throughput previously imparted to the radio terminal apparatus, and connecting the thus-selected base station apparatus to the radio terminal apparatus.

In this case, if the state of load on the base station apparatus connected to the radio terminal apparatus has changed to a previously-imparted undesirable throughput state, the radio terminal apparatus may send a probe signal to a base station apparatus in the vicinity of the radio terminal apparatus, and another station apparatus whose load state is optimum may be selected on the basis of the loadstate signal sent back from the base station apparatus in response to the probe signal as well as on the basis of the throughput and connected to the radio terminal apparatus.

Accordingly, if a plurality of base station apparatus are available to which the radio terminal apparatus can be connected, a base station apparatus capable of providing throughput required for that radio terminal apparatus is selected from among the base station apparatuses that have sent the load-state signals, and the thus-selected base station apparatus is connected to the radio terminal apparatus.

If the throughput required for the radio terminal apparatus has changed, or the state of load on the base station apparatus has changed after the commencement of practical communication between the radio terminal apparatus and the base station apparatus, the radio terminal apparatus can be reconnected to another base station apparatus whose load state is optimum.

The base station apparatus for use in a radiocommunication network of the present invention establishes radio communication with one or more radio terminal apparatuses. The base station apparatus comprises a load state detection section for detecting the state of load on a radiocommunication network during the course of exchange of data between the base station apparatus and the radio terminal apparatus, and a modification section for dynamically modifying the maximum back-off time to prevent collision between data in accordance with the state of load detected by the load state detection section.

The base station apparatus for use in a radiocommunication network of the present invention establishes radio communication with one or more radio terminal apparatuses. The base station apparatus comprises a load state detection section for detecting the state of load on a radiocommunication network during the course of exchange of data between the base station apparatus and the radio terminal apparatus, and a modification section that determines whether to add a control frame when a frame of data is transmitted, in order to ensure a period during which a transmission path is occupied, in accordance with the state of load detected by the load state detection section, and that dynamically modifies the state of addition of the control frame.

The base station apparatus for use in a radiocommunication network of the present invention establishes radio communication with one or more radio terminal apparatuses. The base station apparatus comprises a load state detection section for detecting the state of load on a radiocommunication network during the course of exchange of data between the base station apparatus and the radio terminal apparatus, and a modification section which dynamically modifies the maximum length of a packet at the time of transmission of a frame in accordance with the state of load detected by the load state detection section.

A method of controlling communication across a radiocommunication network of the present invention is applied to a radiocommunication network which comprises one or more radio terminal apparatuses and a base station apparatus that establishes radio communication with the radio terminal apparatuses. The base station apparatus detects the state of load on a radiocommunication network during the course of exchange of data between the base station apparatus and the radio terminal apparatus, and dynamically changes the maximum back-off time for preventing collision between data in accordance with the thus-detected state of load.

A method of controlling communication across a radiocommunication network of the present invention is applied to a radiocommunication network which comprises one or more radio terminal apparatuses, and a base station apparatus that establishes radio communication with the radio terminal apparatuses. The base station apparatus detects the state of load on a radiocommunication network during the course of exchange of data between the base station apparatus and the radio terminal apparatus. In order to ensure the period during which a transmission path is occupied, the base station apparatus determines whether to add a control frame to a frame of data to be transmitted, in accordance with the thus-detected state of load. The base station dynamically modifies the state of addition of the control frame.

A method of controlling communication across a radiocommunication network of the present invention is applied to a radiocommunication network which comprises one or more radio terminal apparatuses and a base station apparatus that establishes radio communication with the radio terminal apparatuses. The base station apparatus detects the state of load on a radiocommunication network during the course of exchange of data between the base station apparatus and the radio terminal apparatus, and dynamically modifies the maximum length of a packet at the time of transmission of a frame in accordance with the thus-detected state of load.

By virtue of these methods, the state of load between the base station apparatus and the radio terminal apparatus during the course of exchange of data is monitored, and the maximum back-off time, the state of addition of a control frame, and the maximum length of a packet are dynamically modified. Therefore, the efficient exchange of data according to the state of load becomes feasible.

In this way, the following effects and advantages can be obtained by the base station apparatus for a radiocommunication network, the method of controlling communication across the radiocommunication network, the radiocommunication network system, and the radio terminal apparatuses.

(1) If another radiocommunication network is detected in the vicinity of the base station apparatus, frequency hopping having a pattern which is completely the same as that of frequency hopping in the thus-detected radiocommunication network is carried out such that an appropriate difference (timing difference) is produced between the frequency hopping of the base station apparatus and the frequency hopping in another radiocommunication network. Therefore, it is possible to actively avoid frequency interference between the frequency hopping of the radiocommunication network of the base station apparatus and the frequency hopping of another radiocommunication network. As a result, there can be ensured prevention of a reduction in throughput which would otherwise be caused by frequency interference.

(2) Since the timing of frequency hopping of the radiocommunication network can be adjusted with respect to the frequency hopping of another radiocommunication network during the course of ordinary operation, it is possible to ensure prevention of frequency interference which would otherwise be caused by a reduction in the timing difference between the frequency hopping of the radiocommunication network of the base station apparatus and the frequency hopping of another radiocommunication network.

(3) If there are a plurality of base station apparatuses to which the radio terminal apparatus can be connected, a base station apparatus capable of providing throughput required for that radio terminal apparatus is selected from among the base station apparatuses that have sent the load-state signals, and the thus-selected base station apparatus can be connected to the radio terminal apparatus. As a result, the required throughput can be ensured, and the throughput of the overall radiocommunication network can be significantly improved.

(4) If the throughput required for the radio terminal apparatus has changed, or the state of load on the base station apparatus has changed after the commencement of practical communication between the radio terminal apparatus and the base station apparatus, the radio terminal apparatus can be reconnected to another base station apparatus whose load state is optimum. As a result, the radiocommunication network system can be efficiently operated at all times in consideration of the throughput of the overall radiocommunication network.

(5) The state of load between the base station apparatus and the radio terminal apparatus during the course of exchange of data is monitored, and the maximum back-off time, the state of addition of a control frame, and the maximum length of a packet are dynamically modified. Therefore, the efficient exchange of data according to the state of load becomes feasible. As a result, the throughput of the radiocommunication network in operation can be maximized.

DESCRIPTION OF THE PREFERRED EMBODIMENT

With reference to the accompanying drawings, a preferred embodiment of the present invention will be described.

Figure 3:
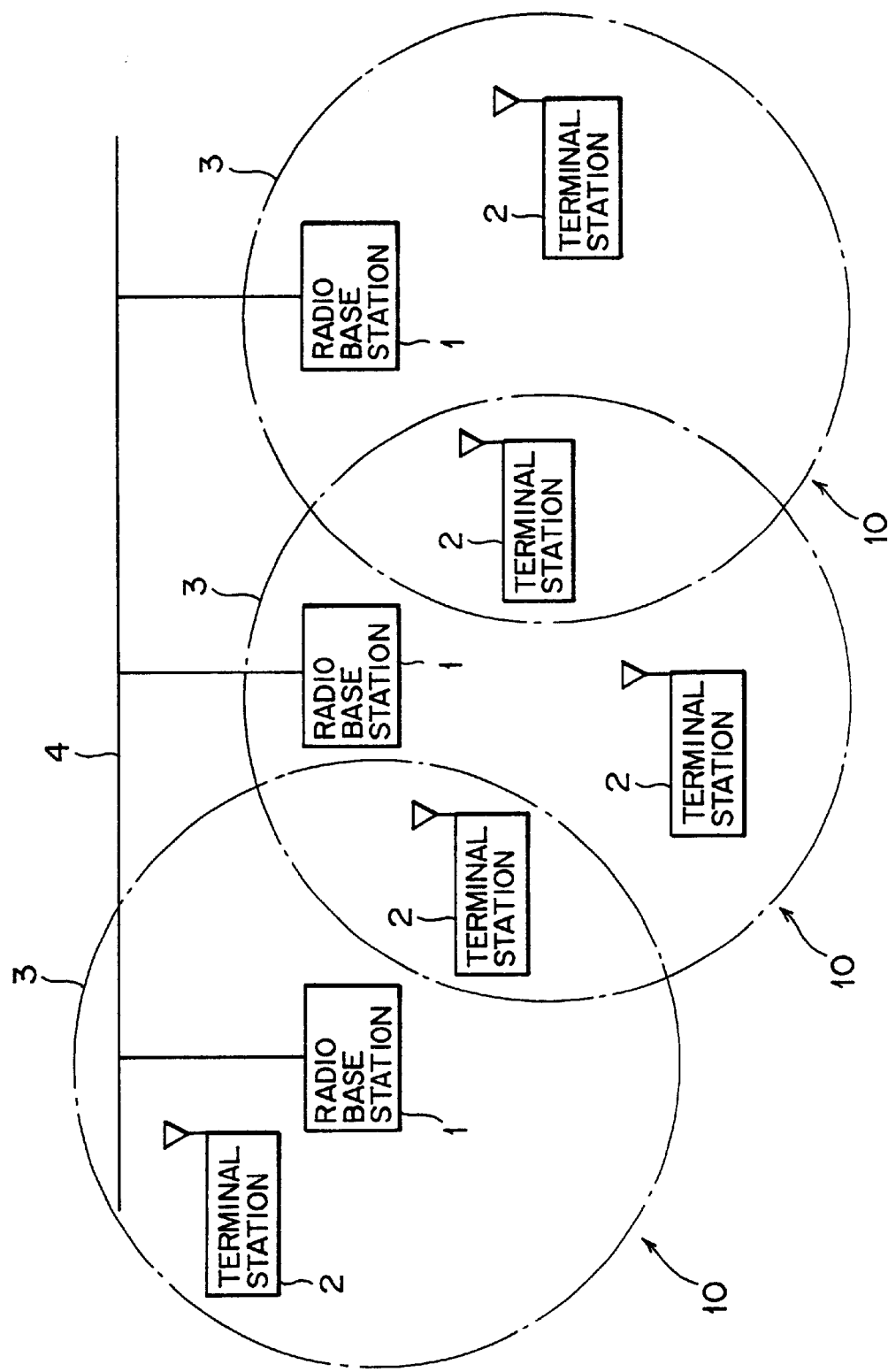
FIG. 3 is a block diagram illustrating a plurality of radio LANs having overlapping radio areas.

With reference to FIG. 3, the construction of a radio LAN (a radiocommunication network system) to which the embodiment of the present invention is applied will be described.

FIG. 3 is a block diagram illustrating a plurality of radio LANs (radio communications networks) which have overlapping radio areas 3. In the example illustrated in FIG. 3, three radio base stations (base station apparatuses for the radiocommunication network) connected to a cable network 4 constitute radio LANs 10, respectively.

Each of the radio LANs 10 is a system for connecting a plurality of terminal stations (radio terminals) 2 to the network without a cable. The radio base station 1 controls the plurality of terminal station 2 existing in each radio area 3 by periodically broadcasting a synchronization frame signal called a beacon signal in the radio area 3. In short, the range to which the synchronization frame signal from each radio base station 1 propagates can be defined as the radio area 3 of each radio LAN 10.

Accordingly, the terminal station 2 in the radio area 3 are capable of establishing communication with a cable terminal 5 connected to the cable network 4 or with another terminal station 2 existing in the radio area 3 via the radio base station 1. Each of the terminal station 2 is constituted in the form of a mobile terminal apparatus for data communication which establishes communication through use of, e.g., a personal computer.

Figure 4:
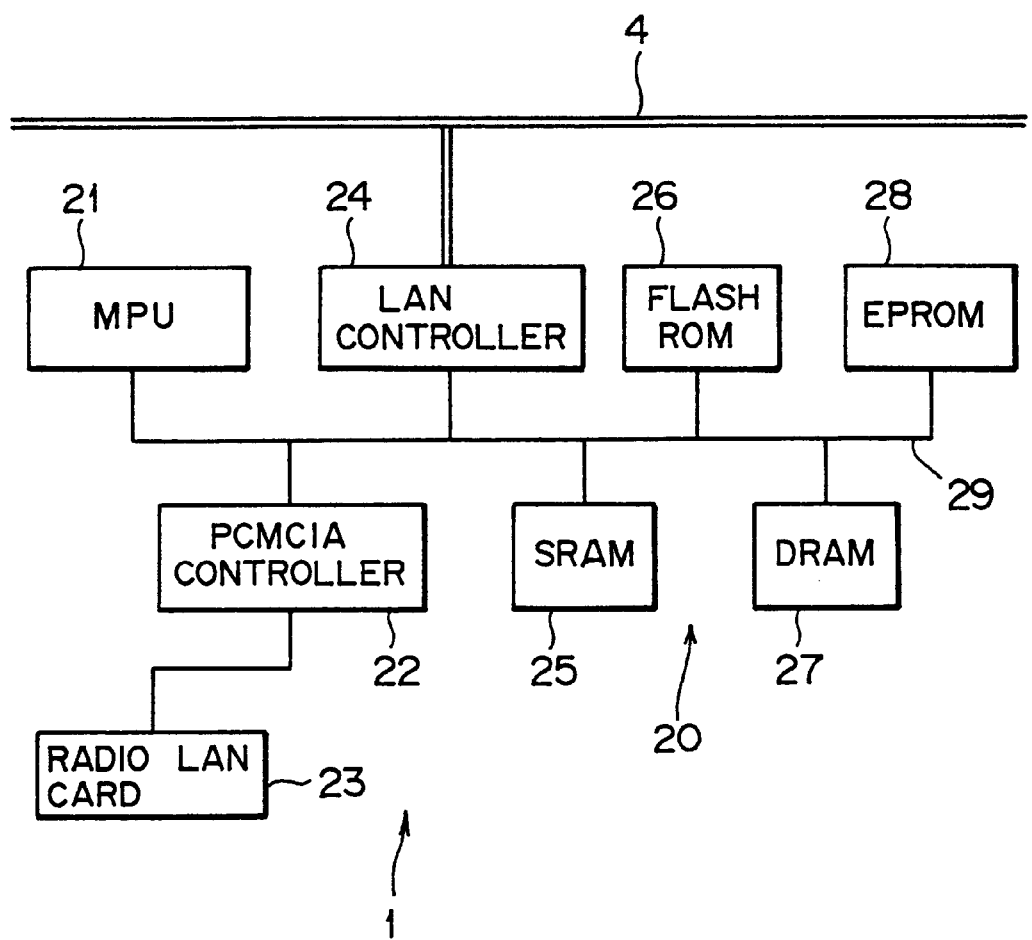
FIG. 4 is a block diagram illustrating the hardware configuration of the radio base station according to the embodiment.

For example, the foregoing radio base station 1 has the hardware configuration illustrated in FIG. 4. Specifically, as shown in FIG. 4, the radio base station 1 is comprised of an MPU (Microprocessor Unit) 21, a PCMCIA (Personal Computer Memory Card International Association) controller 22, a LAN controller 24, an SRAM 25, a FLASH ROM 26, a DRAM 27, and an EPROM 28, all of which are connected together through a bus 29.

The MPU 21 controls each of the constituent elements connected thereto over the bus 29 and manages the terminal station 2 under control of the radio base station 1 (i.e., the terminal station 2 which exist in the radio area 3 and are connected to the radio base station 1).

The PCMCIA controller 22 is connected to a radio LAN card 23 which functions as a radiocommunication section and controls this radio LAN card 23. The radio LAN card 23 has hardware configuration to be described later with reference to FIG. 5. The terminal station 2 is provided with a radio LAN card 23A (see FIG. 5) having the same configuration as a radiocommunication section.

The LAN controller 24 is connected to the cable network 4 and functions as an interface between the cable network 4 and the radio base station 1.

The SRAM 25, the FLASH ROM 26, the DRAM 27, and the EPROM 28 hold programs, data used for executing the programs (e.g., information on the connection between the radio base station 1 and the terminal station 2, and control information related to the terminal station 2), and communication data, and constitute a storage section 20.

In contrast, the terminal station 2 is formed by connecting the radio LAN card 23A (see FIG. 5) which is in compliance with the PCMCIA standard to, e.g., a personal computer. Data are exchanged between the terminal 2 and the radio base station 1 by means of the radio LAN card 23A. The radio base station 1 exchanges data with the terminal station 2 by means of the foregoing radio LAN card 23 (see FIG. 4).

Figure 5:
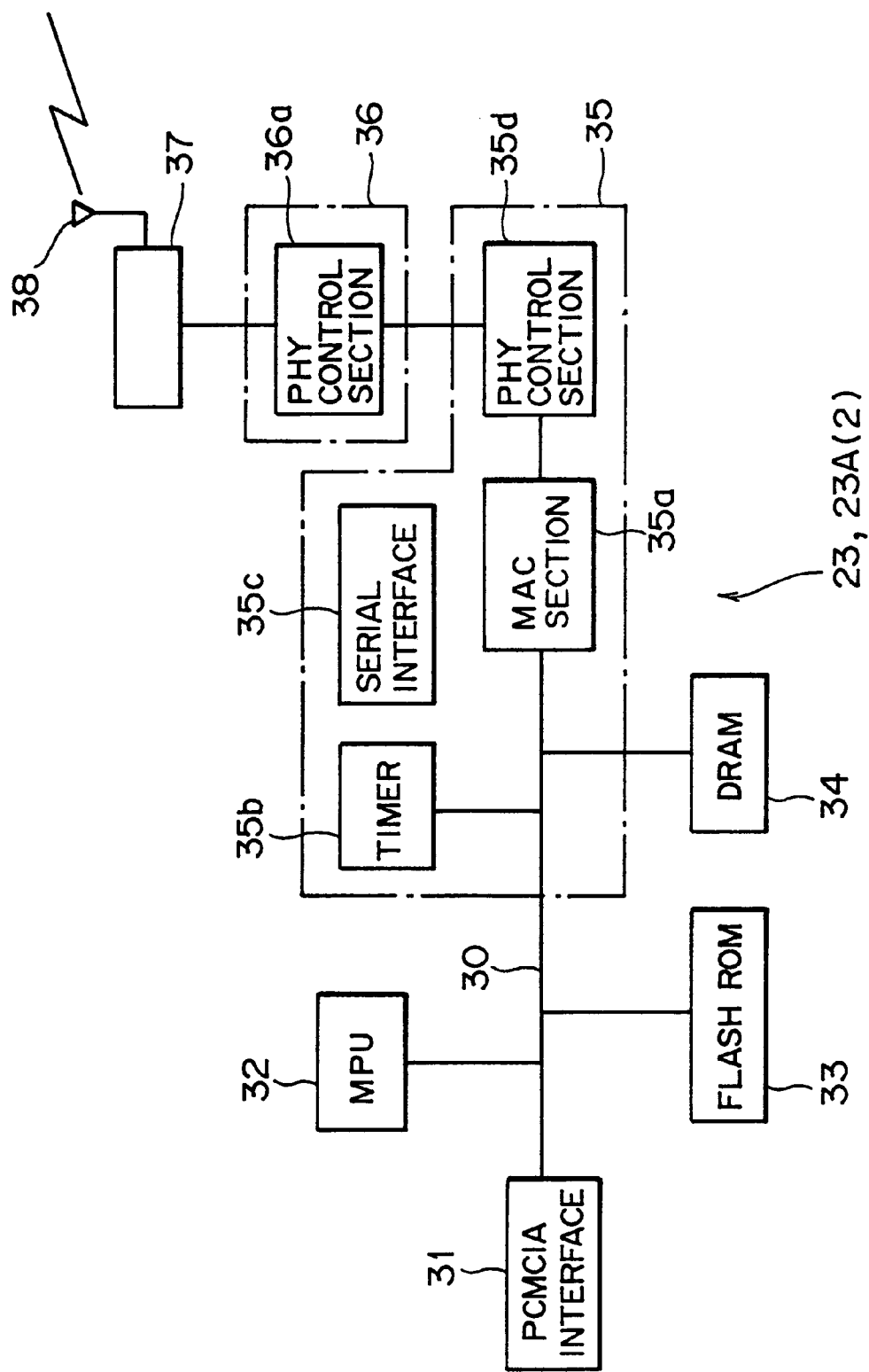
FIG. 5 is a block diagram illustrating the hardware configuration of a radio LAN card (a radio communication section of the radio base station and the terminal station) according to the embodiment.

The radio LAN cards 23, 23A (the radiocommunication sections of the radio base stations 1 and the terminal station 2) have, e.g., the hardware configuration as illustrated in FIG. 5. Each of the radio LAN cards 23, 23A is comprised of a PCMCIA interface 31, an MPU 32, a FLASH ROM 33, a DRAM 34, LSIs 35 and 36, a transmission/reception section 37, and an antenna 38.

The PCMCIA interface 31, the MPU 32, the FLASH ROM 33, the DRAM 34, and the LSI 35 are connected together over the bus 30. The transmission/reception section 37 having the antenna 38 is connected to the LSI 35 through the LSI 36.

The PCMCIA interface 31 exchanges data and signals with a processing section (the PCMCIA controller 22 of the radio base station 1 or an unillustrated processing section, such as a CPU, of the terminal station 2) connected to the radio LAN card 23, 23A.

The MPU 32 totally controls the radio LAN card 23, 23A via the bus 30. The FLASH ROM 33 stores programs, and the DRAM 34 stores data used for executing the programs, and communication data.

The LSI 35 connected to the bus 30 is comprised of a MAC (Media Access Control) section 35a, a timer 35b, a serial interface 35c, and a first physical layer (PHY) control section 35d. The MAC section 35a controls the order in which data are transmitted over a radio circuit. The first physical layer control section 35d functions as a physical layer interface which converts a signal to be transmitted or a received signal through serial/parallel conversion.

The LSI 36 functions as a second physical layer control section (PHY control section) 36a, which in turn functions as a physical layer interface which converts the frequencies of a signal to be transmitted and a received signal.

The transmission/reception section 37 connected to the LSI 36 receives and transmits radio signals via the antenna 38.

Figure 1:
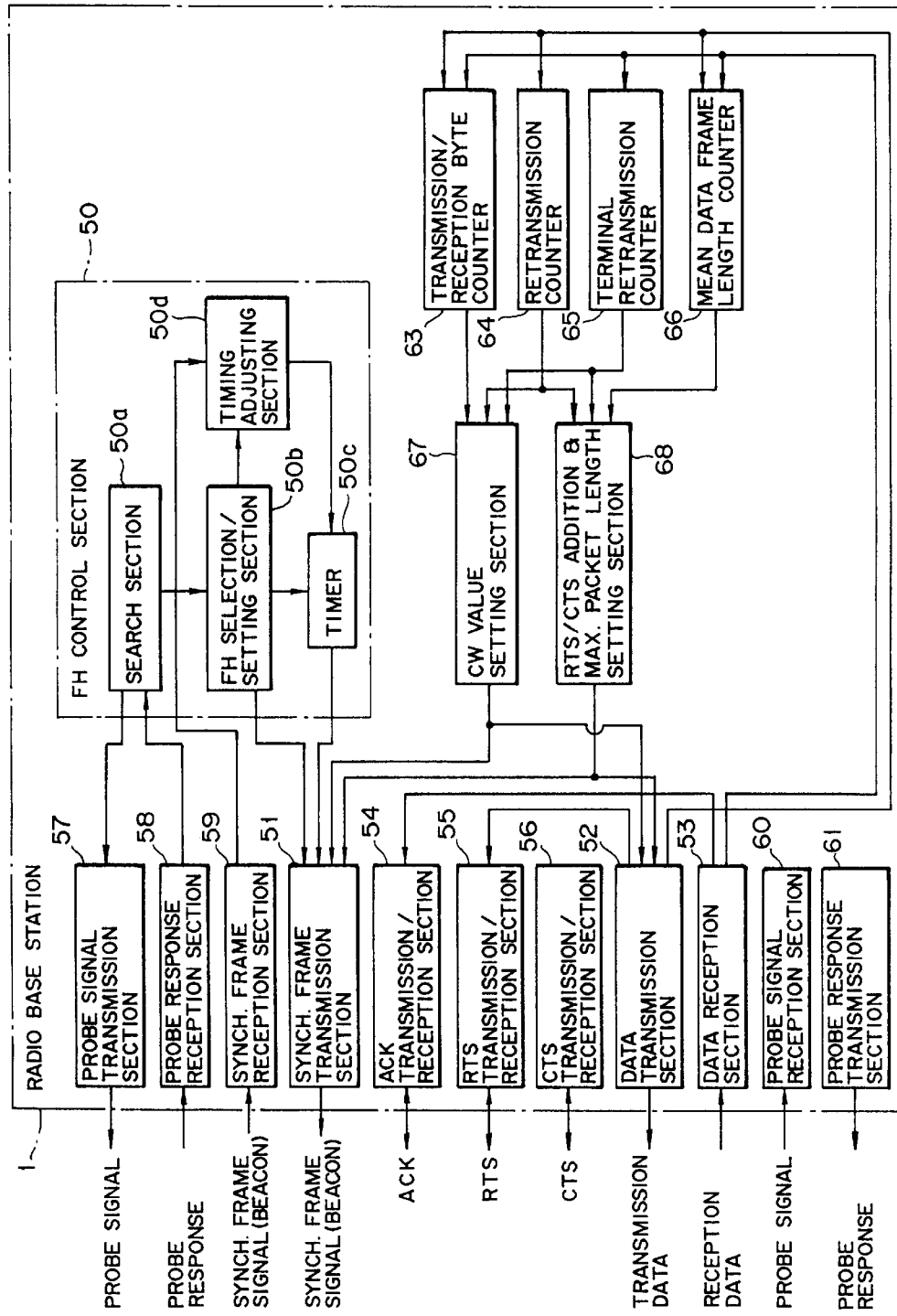
FIG. 1 is a block diagram illustrating the functional structure of a base station apparatus (a radio base station) for use in a radiocommunication network according to one embodiment of the present invention.
Figure 2:
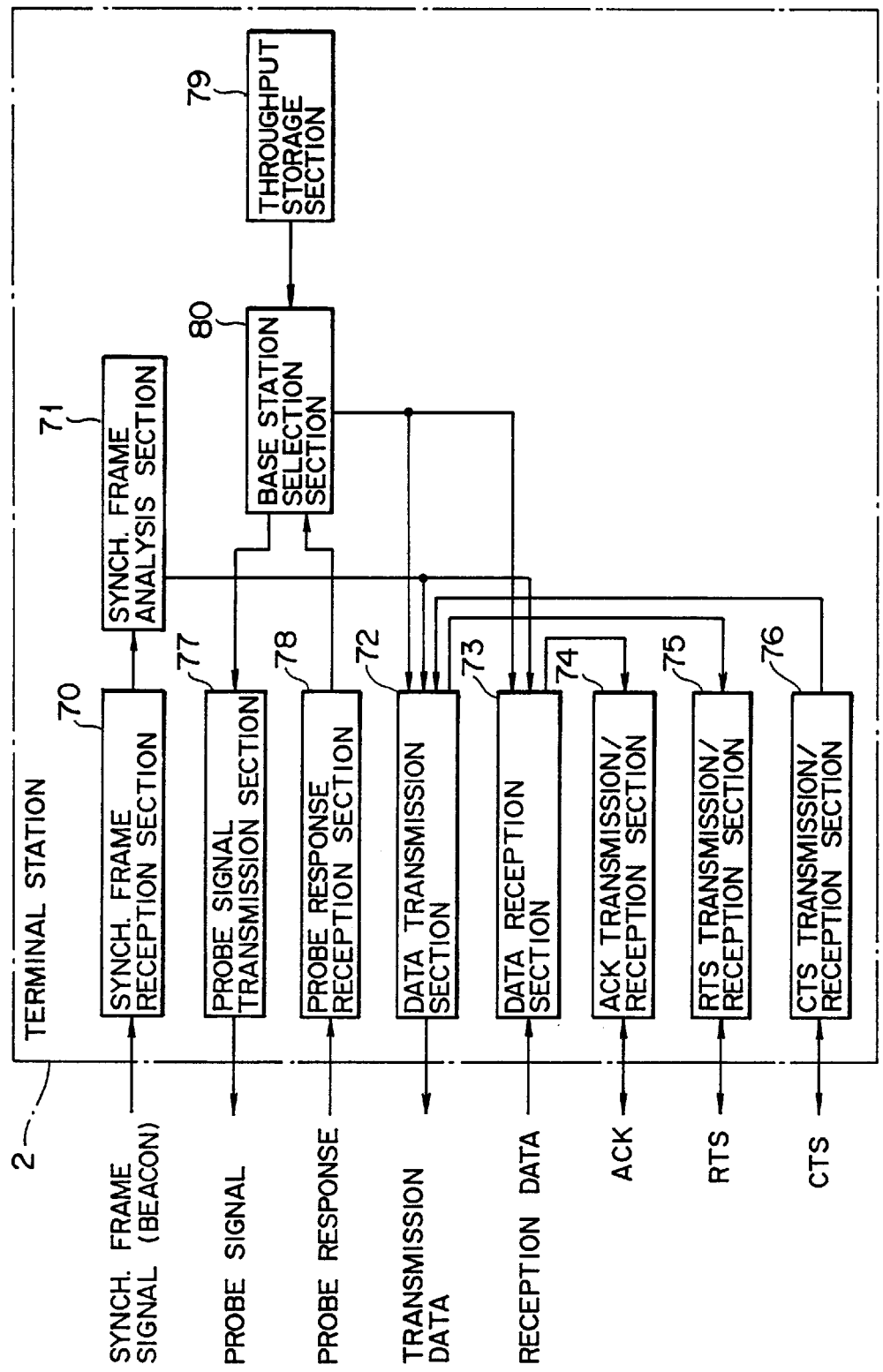
FIG. 2 is a block diagram illustrating the functional structure of a radio terminal (a terminal station) according to the embodiment.

In the radio base station 1 and the terminal station 2 of the present embodiment, the functional structures as illustrated in FIGS. 1 and 2 are implemented by the foregoing hardware configuration.

First, with reference to FIG. 1, the functional structure of the radio base station 1 of the present embodiment will be described.

As illustrated in FIG. 1, the radio base station 1 of the present embodiment is comprised of a frequency hopping control section 50, a synchronization frame signal transmission section 51, a data transmission section 52, a data reception section 53, an acknowledgment signal transmission/reception section 54, an RTS frame transmission/reception section 55, a CTS frame transmission/reception section 56, a probe signal transmission section 57, a probe response signal reception section 58, a synchronization frame signal reception section 59, a probe signal reception section 60, a probe response signal transmission section 61, a load state setting section 62, a byte counter 63 for counting the number of bytes to be transmitted or received bytes, a retransmission counter 64, a terminal retransmission counter 65, a mean data frame length counter 66, a CW (contention window) value setting section 67, and an RTS/CTS frame addition and maximum packet length setting section 68 (hereinafter referred to as an RTS/CTS-addition-and-packet-length-setting section).

The synchronization frame signal transmission section 51 periodically broadcasts a synchronization frame signal called a beacon signal in the radio area 3 so as to control the terminal station 2 existing in the radio area 3 of the radio base station 1. Various items of control information set by the radio base station 1 are transmitted to each of the terminal station 2 by means of the synchronization frame signal.

The data transmission section 52 transmits data to the terminal station 2, and the data reception section 53 receives data from the terminal station 2.

The acknowledgment (ACK) signal transmission/reception section 54 transmits or receives an acknowledgment (ACK) signal. When the data reception section 53 has finished receiving data from the terminal station 2, the ACK signal transmission/reception section 54 sends an ACK signal to the terminal station 2 that has transmitted the data. In contrast, when the data transmission section 52 has transmitted data to the terminal station 2, the ACK signal transmission/reception section 54 receives an ACK signal from the terminal station 2 that has received the data.

The RTS frame transmission/reception section 55 transmits or receives an RTS (Request-to-send) frame as a control frame. In order to previously ensure the time during which a transmission path is occupied when data is transmitted to the terminal station 2, the RTS frame transmission/reception section 55 sends an RTS frame to the terminal station 2 which will receive data. In contrast, the RTS frame transmission/reception section 55 receives an RTS frame from the terminal station 2. That is, the RTS frame transmission/reception section 55 transmits an RTS frame prior to the transmission of data from the data transmission section 52 to the terminal station 2.

The CTS frame transmission/reception section 56 transmits or receives a CTS (Clear-to-send) frame as a control frame. If the time at which the transmission path is occupied is ensured in accordance with the RTS frame received from the terminal station 2, the CTS frame transmission/reception section 56 sends the CTS frame to that terminal station 2 and receives the CTS frame from the same terminal station 2. When the CTS frame transmission/reception section 56 has received the CTS frame, the data transmission section 52 commences the transmission of data to the terminal station 2.

In the present embodiment, whether or not the RTS or CTS frame is added is determined by the function of the RTS/CTS-addition-and-packet-length-setting section 68 to be described later.

Upon receipt of an instruction from a search section 50a which will be described later, the probe signal transmission section 57 sends a probe signal to the radio area 3 in order to scan the state of operation of another radio LAN 10 in the vicinity of the radio base station 1 at the time of activation of the radio base station 1. In response to the probe signal transmitted from the probe signal transmission section 57, the probe response reception section 58 receives a probe response (probe response signal) sent from the radio base station 1 of another LAN 10.

The probe response signal includes information about the pattern and time of frequency hopping (FH) already set by that radio base station 1. Although not shown in FIG. 1, the radio base station 1 of the present embodiment also has a function of sending a probe response signal including information about the FH pattern already set and time of frequency hopping when the probe signal is received from another radio base station 1.

The synchronization frame signal reception section 59 receives a synchronization frame signal (a beacon signal) sent from another radio base station 1 while the radio base station 1 is in an ordinary operating state.

Figure 6:
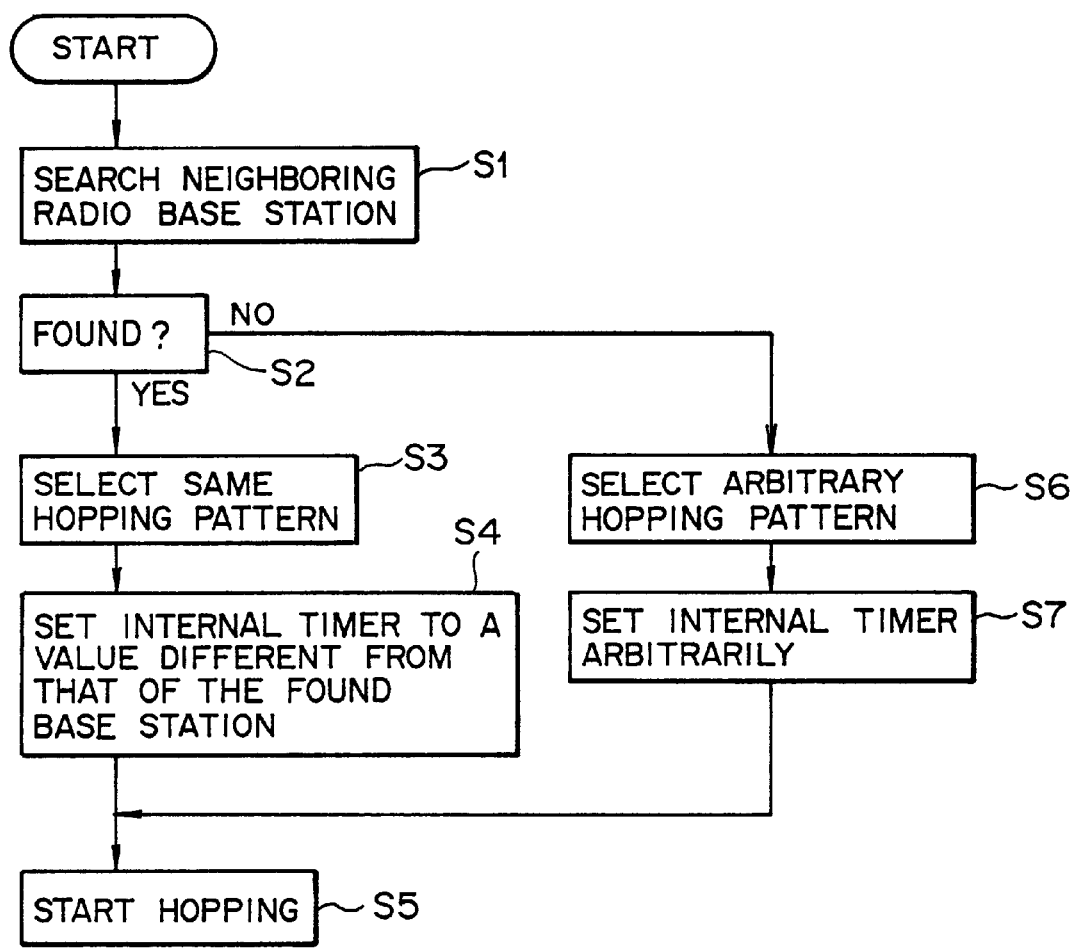
FIG. 6 is a flowchart for illustrating the operation of the radio base station (the determination of a hopping pattern/timing) according to the present embodiment.
Figure 7:
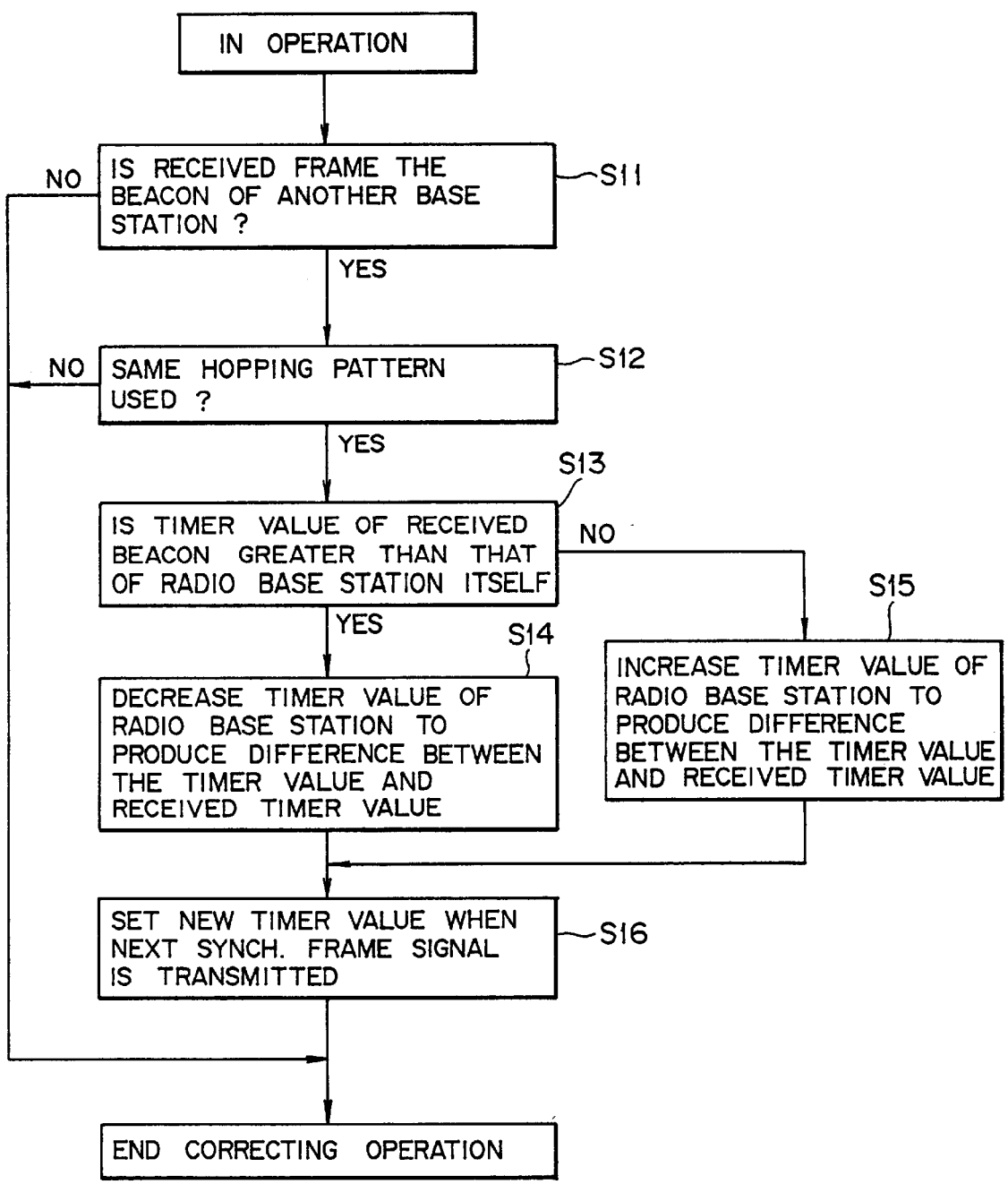
FIG. 7 is a flowchart for illustrating the operation of the radio base station (the correction of timing of frequency hopping) according to the embodiment.

The frequency hopping control section (FH control section) 50 operates in accordance with a flowchart illustrated in FIGS. 6 and 7 and controls the timing and time of frequency hopping of the radio base station 1. The frequency hopping control section 50 is comprised of a search section 50a, a frequency hopping selection/setting section 50b, a timer 50c, and a timing adjusting section 50d.

When the radio LAN 10 is started as a result of activation of the radio base station 1, the search section 50a sends a probe signal to the probe signal transmission section 57 in order to detect another radio LAN 10 in the vicinity of the radio base station 1. If the probe response reception section 58 receives a probe response signal from another radio base station 1 in response to the transmitted probe signal (i.e., if there is another radio LAN 10 in the vicinity of the LAN 10 of the radio base station 1), the search section 50a reads the pattern and time of frequency hopping in the thus-detected radio LAN 10 (the radio base station 1 in that LAN 10) from the probe response signal.

The frequency hopping selection/setting section (FH selection/setting section) 50b selects the pattern of frequency hopping in another radio LAN 10 thus obtained by the search section 50a as the frequency hopping pattern of the radio base station 1. On the basis of the time of frequency hopping thus obtained by the search section 50a, the frequency hopping selection/setting section 50b selects timing at which frequency interference does not occur between the frequency hopping determined by the thus-selected pattern and the frequency hopping performed in another radio LAN 10. The frequency hopping selection/setting section 50b sets the timer 50c to a time corresponding to the thus-selected timing in order to carry out frequency hopping in accordance with the foregoing pattern at the thus-selected timing.

The FH pattern selected and set by the FH selection/setting section 50b and the time set in the timer 50c are imparted to the synchronization frame signal as control information by the synchronization frame signal transmission section 51. Each of the terminal station 2 is notified of the control information by way of the synchronization frame signal. Accordingly, each terminal station 2 that has received the synchronization frame signal analyzes the synchronization frame signal to thereby read the FH pattern and the time. As a result of execution of frequency hopping in synchronization with the radio base station 1, communication is established with the radio base station 1.

The timer 50c is set to the time of frequency hopping by the FH selection/setting section 50b as previously described, and channels in the frequency range corresponding to the time indicated by the timer 50c are sequentially selected, thereby executing frequency hopping.

For example, if frequency hopping is carried out among 23 channels according to a predetermined FH pattern at a rate of 400 msec. per channel, the timer 50c commences counting from 0 and restarts counting from 0 after the counted time has reached 400 msec.×23=9200 msec. When the timer 50c indicates any value in the range from 0 to 400 msec., the first channel in the predetermined FH pattern is selected. When any value in the range from 400 to 800 msec. is indicated by the timer 50c, the second channel is selected. In an analogous fashion, the third to $22^{nd}$ channels are selected. When any value in the range from 8800 to 9200 msec. is indicated, the $23^{rd}$ channel is selected.

The FH time is a time indicated by the timer 50c (i.e., a timer value). For example, if the timer 50c is set to 1000 msec., as the FH time of the radio base station 1, when the FH time of another radio base station 1 is 200 msec., frequency hopping is repeatedly executed according to completely the same FH pattern by both radio base stations 1 while there is a time difference between the radio base stations 1 by 800 msec, i.e., an amount corresponding to two channels.

If the synchronization frame signal reception section 59 receives a synchronization frame signal (a beacon signal) from another radio base station 1 while the radio base station 1 is in an ordinary operating state, the timing adjusting section 50d reads the pattern and time of frequency hopping from the thus-received synchronization frame signal. If the patterns are identical with each other, the timing adjusting section 50d controls the timing of frequency hopping of the radio base station 1 with respect to the frequency hopping of another radio LAN 10 by changing a value of the timer 50c according to that time (or the timer value).

The risk of frequency interference which would otherwise result from the operation of a network for a long period of time is prevented by correcting the value of the timer 50c each other between the radio base station 1 and another radio base station 1 in the vicinity thereof.

The probe signal reception section 60 receives a probe signal from the terminal station 2 existing in the radio area 3 of the radio base station 1 itself while the radio base station 1 is in an ordinary operating state. When the probe signal reception section 60 receives a probe signal from the terminal station 2, the probe response signal transmission section (or the load state signal transmission section) 61 sends, as a probe response signal, a signal regarding the state of load set in the load state setting section 62, which will be described later, to the terminal station 2 which has sent the probe signal.

The load state setting section (load state signal transmission section) 62 sets the state of load on the radio LAN 10 under control of the radio base station 1 [e.g., 1̂ the number of terminals having a high degree of load for the performance of the transmission path or 2̂ the number of received bytes or bytes to be transmitted per unit time (a value counted by the byte counter 63 which will be described later)] in the form of information included in the probe response signal transmitted by the probe response signal transmission section 61.

In contrast, the byte counter (the load state detection section) 63 counts the number of bytes transmitted from or received by the radio base station 1 per unit time, in the form of the state of load on the radio LAN 10.

The retransmission counter (the load state detection section) 64 counts the number of attempts of retransmission from the radio base station 1 to the respective terminal stations 2 per unit time (i.e., the number of times retransmission is attempted due to occurrence of collision during data transmission) as the state of load on the radio LAN 10.

The retransmission counter (the load state detection section) 65 counts the number of attempts of retransmission per unit time contained as information in the data received from the terminal station 2 (i.e., the number of times retransmission is attempted until the data can be successfully transmitted to the terminal station 2) as the state of load on the radio LAN 10.

The mean data frame length counter 66 counts a mean value of the frame length of data exchanged between the terminal station 2 and the radio base station 1.

Figure 9:
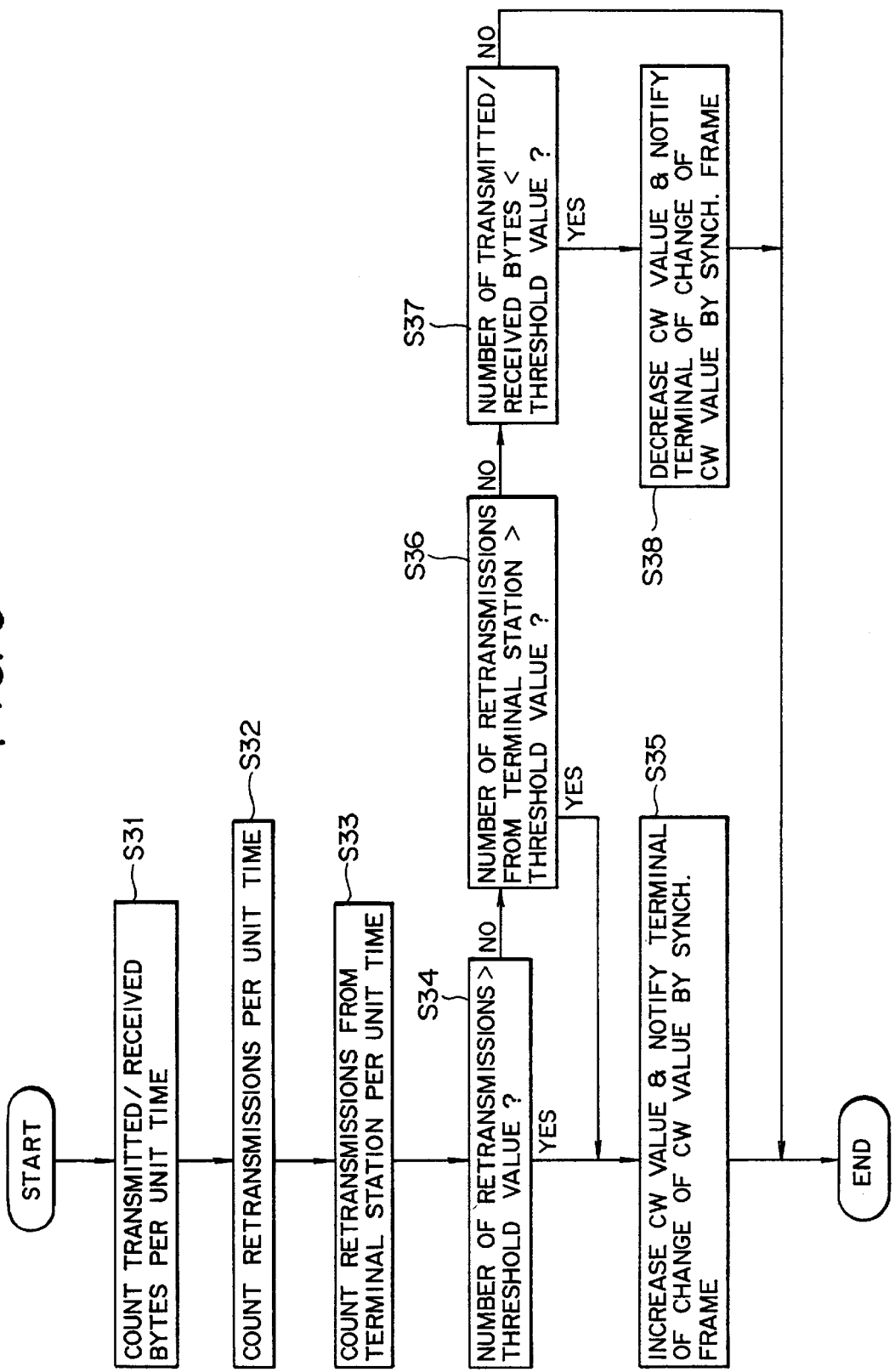
FIG. 9 is a flowchart for illustrating the operation of the radio base station (the changing of the value of a contention window (CW)) according to the embodiment.

The CW value setting section (modification section) 67 operates in accordance with a flowchart shown in FIG. 9. The CW value setting section 67 dynamically modifies the width of a contention window (CW) which is the maximum back-off time to avoid a collision between data, in accordance with the number of bytes to be transmitted or received bytes per unit time which is counted by the byte counter 63, the number of times retransmission has been performed per unit time which is counted by the retransmission counter 64, and the number of times the terminal station 2 has performed retransmission per unit time which is counted by the terminal retransmission counter 65.

The back-off time is a stand-by time until data is retransmitted if collision occurs at the time of transmission of the data. In the present embodiment, as will be described later with reference to FIG. 9, the frame interval which reduces collision can be set by dynamically changing the CW value in accordance with the number of bytes to be transmitted or received bytes, the number of attempts of retransmission (the number of occurrences of collision/contention), or the like. The CW value set by the CW value setting section 67 is transmitted to the data transmission section 52 in the form of control information required for retransmission. Further, the value is imparted to the synchronization frame signal in the form of control information by the synchronization frame signal transmission section 51. The terminal station 2 is notified of the value by way of the synchronization frame signal.

Figure 10:
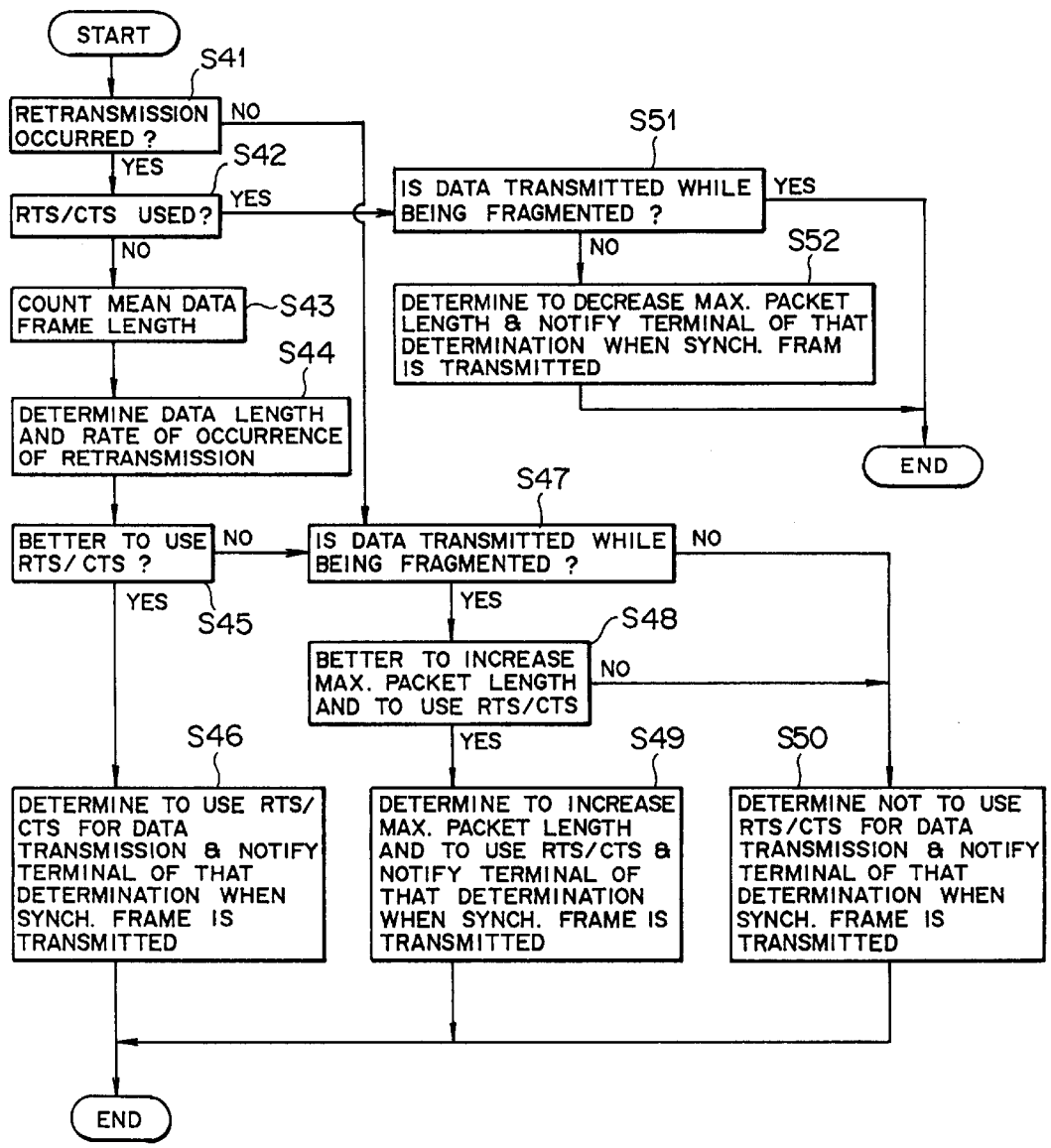
FIG. 10 is a flowchart for illustrating the operation of the radio base station (the addition of RTS/CTS and the changing of the maximum length of a packet) according to the embodiment.

The RTS/CTS-addition-and-packet-length-setting section (modification section) 68 operates in accordance with a flowchart shown in FIG. 10 and has function 1̂ of setting or changing the state of addition of the RTS/CTS frame, and function 2̂ of setting or changing the maximum packet length.

Function 1̂ is intended to determine whether or not the transmission performance of the radio base station 1 is improved by addition of the RTS/CTS frame to the synchronization frame signal, on the basis of the rate of retransmission obtained from results of the counting performed by the retransmission counter 64 and the terminal retransmission counter 65 and a mean data frame length counted by the mean data frame length counter 66. As a result of the determination, it is decided whether or not the RTS/CTS frame is to be used. Thus, the use (addition) of the RTS/CTS frame is dynamically changed. A criterion for determination of the transmission performance will be described with reference to FIG. 11.

Function 2̂ is intended to dynamically change the maximum packet length at the time of transmission of the synchronization frame signal in accordance with the number of attempts of retransmission (i.e., the number of occurrences of collision/contention) which is counted by the retransmission counter 64 and the terminal retransmission counter 65. According to the basic standards for modification, the maximum packet length is set to a smaller length if the number of times retransmission is attempted is large (i.e., if the number of occurrences of collision is large), whereby data are sent in the form of fragments. In contrast, if the number of times retransmission is attempted is small (i.e., if the number of occurrences of collision is small), the maximum packet length is set to a larger length.

Information about a determination as to whether or not the RTS/CTS frame is to be added to the synchronization frame signal and the maximum packet length, both of which are determined by the RTS/CTS-addition-and-packet-length-setting section 68, are sent to the data transmission section 52 in the form of control information required for data transmission. Further, the information and the maximum packet length are imparted to the synchronization frame signal in the form of control information by the synchronization frame transmission section 51 and are notified to the terminal station 2 by way of the synchronization frame signal.

With reference to FIG. 2, the functional structure of the terminal station 2 of the present embodiment will be described. As illustrated in FIG. 2, the terminal station 2 of the present embodiment is comprised of a synchronization frame signal reception section 70, a synchronization frame analysis section 71, a data transmission section 72, a data reception section 73, an ACK transmission/reception section 74, an RTS frame transmission/reception section 75, a CTS frame transmission/reception section 76, a probe signal transmission section 77, a probe response signal reception section 78, a throughput storage section 79, and a base station selection section 80.

The synchronization frame signal reception section 70 receives a synchronization frame signal (i.e., a beacon signal) from the radio base station 1. The thus-received synchronization frame signal is analyzed by the synchronization frame analysis section 71, whereby the foregoing various control information included in the synchronization frame signal is read. The thus-read control information is used for controlling the terminal station 2.

The data transmission section 72 transmits data to the radio base station 1, and the data reception section 73 receives data from the radio base station 1.

The ACK transmission/reception section 74 transmits or receives an acknowledgment (ACK) signal. When the data reception section 73 has finished receiving data from the radio base station 1, the ACK transmission/reception section 74 sends an acknowledgment signal to the radio base station 1 which has transmitted the data. In contrast, when the data transmission section 72 has sent data to the radio base station 1, the ACK signal transmission/reception section 74 receives an acknowledgment signal from the radio base station 1 which has received the data.

The RTS frame transmission/reception section 75 transmits or receives an RTS (Request-to-send) frame in the form of a control frame. In order to previously ensure the period of time during which a transmission path is occupied when data are transmitted to the radio base station 1, the RTS frame transmission/reception section 75 transmits the RTS frame to the radio base station 1 which will receive the data and receives the RTS frame from the radio base station 1. That is, the RTS transmission/reception section 75 transmits an RTS frame to the radio base station 1 before the data transmission section 72 sends data to the radio base station 1.

The CTS frame transmission/reception section 76 transmits or receives a CTS (Clear-to-send) frame in the form of a control frame. When the period of time during which the transmission path is occupied is ensured according to the RTS frame received from the radio base station 1, the CTS frame transmission/reception section 76 sends the CTS frame to the radio base station 1 and receives the CTS frame from the same. When the CTS frame transmission/reception section 76 has received the CTS frame, the data transmission section 72 commences the transmission of data to the radio base station 1.

As previously described, whether or not the RTS or CTS frame is added to the synchronization frame signal is determined by the RTS/CTS addition information included in the synchronization frame signal in the form of control information.

The probe signal transmission section 77 sends a probe signal to detect another radio base station 1 in the vicinity of the radio base station 1 before the terminal station 2 is connected to the radio base station 1.

The probe response signal reception section 78 receives a probe response signal received from the radio base station 1 in the vicinity of the radio base station 1 in accordance with the probe signal sent from the probe signal transmission section 77. As previously described, the load state setting section 62 of the radio base station 1 sets the state of load on the radio LAN 10 (e.g., 1̂ the number of heavy-loaded terminals connected to the radio base station, and 2̂ the number of bytes to be transmitted or received bytes per unit time) to the probe response signal.

The throughput storage section 79 is previously imparted with throughput corresponding to an application required for the terminal station 2 and stores it in the form of information.

The base station selection section 80 selects the radio base station 1 whose load state is optimum on the basis of the state of load included in the probe response signal received from the probe response signal reception section 78, as well as on the basis of the throughput required for the terminal station 2 stored in the throughput storage section 79. The base station selection section 80 connects the thus selected radio base station 1 to the terminal station 2. That is, the terminal station 2 selects a radio base station 1 capable of providing required throughput from among the radio base stations 1 which sent the probe response signals, by means of the function of the base station selection section 80. The thus-selected radio base station 1 is connected to the terminal station 2.

If the state of load on the radio base station 1 connected to the terminal station 2 becomes the state which is stored in the throughput storage section 79 as being undesirable for the throughput, the base station selection section 80 of the present embodiment automatically selects, changes, or reconnects the terminal station 2 to another radio base station 1 whose load state is optimum on the basis of a load-state signal returned from the radio base station 1 in response to the probe signal sent from the probe signal transmission section 77, as well as on the basis of the throughput stored in the throughput storage section 79.

With reference to FIGS. 6 through 11, the operation of the radio base station 1 and the terminal station 2 of the present embodiment having the foregoing structure will be described with regard to each of items [1] to [5].

[1] Determination of the Pattern and Timing of Frequency Hopping

In accordance with a flowchart (steps S1 to S7) in FIG. 6, the determination of the pattern and timing of frequency hopping performed by the radio base station 1 of the present embodiment will be described.

When the radio LAN 10 is started as a result of activation of the radio base station 1, the radio base station 1 detects another radio LAN 10 (another radio base station 1) in the vicinity of the radio base station 1 in the same way that the terminal station 2 usually detects the radio base station 1 in the vicinity of the terminal station 2 by sending a probe signal when it is connected to the radio base station 1 (step S1). At this time, the search section 50a causes the probe signal transmission section 57 to transmit a probe signal.

On the basis of the result of a determination as to whether the probe response signal reception section 58 has received a probe response signal from another radio base station 1 in response to the probe signal, it is determined whether or not there is another radio base station 1 in the vicinity of the radio base station 1 (step S2).

If there is not a probe response signal from another radio base station 1 (NO in step S2), there is no risk of frequency interference occurring with another radio LAN 10. Therefore, the FH selection/setting section 50b arbitrarily selects the frequency hopping pattern (step S6), and the timer 50c is set to an arbitrary time (a timer value) (step S7). Frequency hopping Is then commenced (step S5).

In contrast, If there is a probe response signal from another radio base station 1 (YES in step S2), the search section 50a obtains, from the received probe response, the pat tern and time (the timer value) of frequency hopping performed in another radio LAN 10 (another radio base station 1). The FH selection/setting section 50b selects, as the frequency hopping pattern of the radio base station itself, a frequency hopping pattern which is completely the same as that of the thus-obtained frequency hopping (step S3), and sets the timer 50c to a value different from the timer value (time) obtained from the probe response signal (e.g.: a value deviated from 800 msec or more) (step S4). Subsequently, frequency hopping (FH) is started (step S5).

By setting the value of the timer 50c in the above-described manner, timing is selected at which no frequency interference occurs between the frequency hopping according to the previously-described pattern and frequency hopping performed in another radio LAN 10.

As previously described, the pattern and the timer value selected/set in steps S3, S4, S6, and S7 are imparted to the synchronization frame signal by the synchronization frame transmission section 51 in the form of control information. Each of the terminal station 2 received the synchronization frame signals performs frequency hopping in synchronization with the radio base station 1 according to the frequency hopping pattern and the timer value to thereby establish communication with the radio base station 1.

As illustrated in FIG. 3, if there is another radio LAN 10 in the vicinity of the radio base station 1, frequency hopping is executed repeatedly in accordance with completely the same pattern at timing shifted from that for another radio LAN 10. As a result, it is possible to actively avoid frequency interference between the frequency hopping of the radio LAN 10 and frequency hopping of another radio LAN 10, thereby ensuring prevention of a reduction in throughput which would otherwise be caused by frequency interference.

Accordingly, the maximum throughput in terms of electronic waves can be provided for each radio LAN 10 under the circumstance where there are a plurality of adjacent networks (radio LANs 10) which can interference with each other.

If there are a plurality of radio base stations 1 in the vicinity of the base station 1 as a result of detection of another radio base station 1 in the vicinity of the radio base station 1, and if a plurality of different frequency hopping patterns are used, a radio base station 1 which is most influential (i.e., a radio base station 1 from which a strongest reception frame is received) is selected from among the radio base stations 1 that have sent the probe response signals, the frequency hopping pattern and time (or timer value) are set for the radio base station 1 itself upon reference to the frequency hopping pattern and time of the thus-selected radio base station 1.

[2] Correction of Timing of Frequency Hopping

Correction of timing of frequency hopping performed in the radio base station 1 will be described in accordance with a flowchart (steps S11 to S16) shown in FIG. 7.

After frequency hopping has been commenced according to the procedures described with reference to FIG. 6, channels are switched (or frequency hopping is performed) every 400 msec. in accordance with the value (time) indicated by the timer 50c in the way as previously described. If the radio base stations are continuously used for a long period of time, the timing of the frequency hopping is gradually shifted because of errors in the performance of each timer 50c between the radio base stations 1 in the vicinity of the radio base station 1 of interest. If the timers 50c are left just as they are, there is a risk of frequency interference, which in turn results in a reduction in throughput.

In order to avoid the interference due to accumulation of errors in the timers 50c, the timing of the frequency hopping is corrected in the manner as illustrated in FIG. 7 by means of the function of the timing adjusting section 50d.

While the radio base station 1 is in an ordinary operating state, it is determined whether or not a received frame is a synchronization frame signal received from another radio base station 1; namely, whether or not the synchronization frame signal reception section 59 has received a synchronization frame signal from another radio base station 1 (step S11). If the synchronization frame signal is received (YES), the timing adjusting section 50d determines whether or not the same frequency hopping pattern is used, with reference to the control information included in the synchronization frame signal (step S12).

If it has been decided that the same frequency hopping pattern is used (YES), the timing adjusting section 50d compares a timer value t1 at which no synchronization frame signal is received with a value t0 of the timer 50c of the radio base station 1 of interest and, then, decides whether t1>t0 (step S13).

If it has been decided that t1>t0 (YES), the value of the timer 50c of the radio base station 1 is decreased so as to produce a difference greater than a predetermined value (e.g., 800 msec) with respect to the received timer value (step S14). In contrast, if it has been decided t1≦t0 (NO), the value of the timer 50c of the radio base station 1 is increased so as to produce a difference greater than a predetermined value (e.g., 800 msec) with respect to the received timer value (step S15).

When the synchronization frame transmission section 51 sends the next synchronization frame signal, a new timer value set in steps S14 and S15 is set in the synchronization frame signal in the form of control information, thereby correcting the timer value for frequency hopping provided in each of the terminal station 2 connected to the radio base station 1 (step S16).

As a result of mutual correction of the values of the timers 50c between the radio base station 1 and another radio base stations 1 in the vicinity thereof, it becomes possible to prevent an increase in the risk of frequency interference which would otherwise be caused by a gradual reduction in the timing difference between the frequency hopping of the radio LAN 10 and frequency hopping of another radio LAN 10 as a result of variations with time associated with the operation of the radiocommunication network over a long period of time. Consequently, the prevention of a reduction in throughput due to frequency interference can be ensured to a much greater extent.

[3] Selection of a Radio Base Station

The radio-base-station-selecting operation of the terminal station 2 of the present embodiment will be described with reference to a flowchart (steps S21 through S27) illustrated in FIG. 8.

The terminal stations 2 are different from each other in terms of the degree of throughput and of concentration of data depending on the applications of the terminal station 2. If a plurality of radio base stations 1 are selectable as illustrated in FIG. 3, the throughput of the overall radiocommunication network can be improved by selecting the radio base station 1 to which the terminal stations 2 are connected depending on the information of each terminal station 2.

Figure 8:
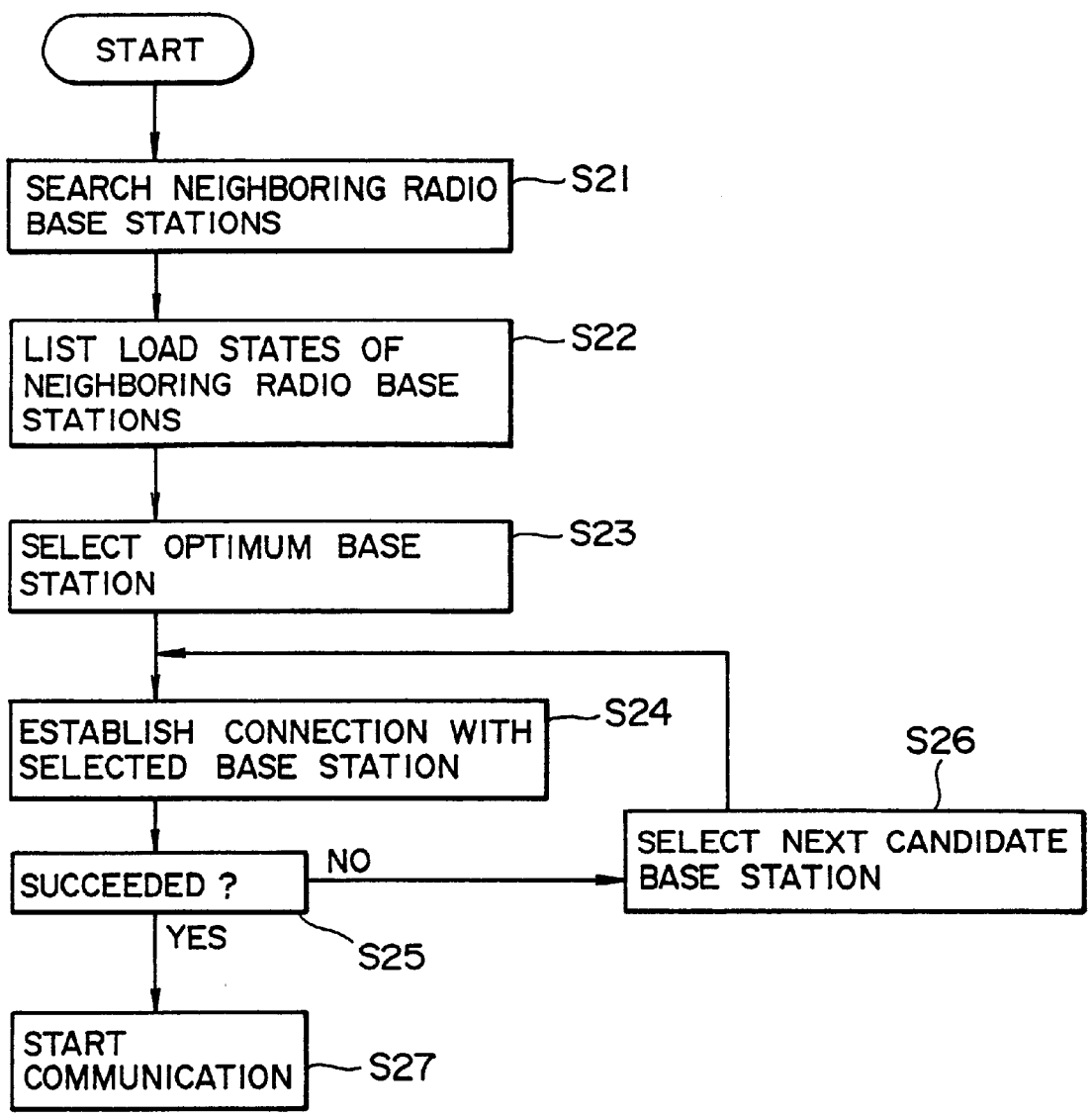
FIG. 8 is a flowchart for illustrating the operation of the terminal station (the selection of a radio base station) according to the embodiment.

To this end, the terminal station 2 of the present embodiment selects the radio base station 1 by means of the function of the base station selection section 80 in accordance with a flowchart shown in FIG. 8.

To incorporate the terminal station 2 into the radiocommunication network, throughput which would be required for that terminal station 2 is estimated based on a network application used by the terminal station 2, and the thus-estimated throughput is stored in the throughput storage section 79.

When the terminal station 2 is connected to the radio base station 1, the probe signal transmission section 77 sends a probe signal to the radio base stations 1 around the radio base station 1 of interest. The probe response signal reception section 78 receives a probe response signal from the radio base stations 1 to thereby search for the radio base stations 1 in the vicinity of the radio base station 1 of interest (step S21).

At this time, in the radio base station 1 that has received a probe signal, the state of load set by the load state setting section 62 is sent, as a probe response signal, from the probe response signal transmission section 61 back to the terminal station 2 that has sent the probe signal. Accordingly, the probe response signal received from the radio base station 1 includes the state of load on the radio LAN 10 managed by each radio base station 1.

The terminal station 2 that has received probe response signals from the plurality of radio base stations 1 lists the states of load on the radio base stations 1 (i.e., $\hat{1}$ the number of terminals having heavy load with reference to the performance of the transmission path, and $\hat{2}$ the number of bytes to be transmitted or received bytes per unit time) (step S22). With reference to the list, the terminal station 2 selects the radio base station 1 that has the state of load optimum for the terminal station on the basis of the required throughput stored in the throughput storage section 79 (step S23).

Subsequently, the terminal station 2 is connected to the thus-selected radio base station 1 (step S24). If the terminal station 2 is successfully connected to the radio base station 1 (YES in step S25), communication is commenced (S27). If the establishment of connection is failed (NO in step S25), the next candidate for the connectable radio base station 1 is selected from the list (step S26). Then, the terminal station 2 is connected to the thus-selected radio base station 1 (step S24).

For example, if the terminal station 2 requires a higher degree of throughput as a result of use of, e.g., a network drive, $\hat{1}$ the radio base station 1 that has a smaller number of heavy-loaded connection terminals is selected from among the radio base stations 1, thereby alleviating contention in which the terminal station 2 that require heavy load attempt to use the same transmission path. In contrast, the terminal station 2 (which transmits or receives only electronic mails or text data) which does not necessarily require a high degree of throughput constantly selects and is connected to $\hat{2}$ the radio base station 1 having a large number of bytes to be transmitted or received bytes (or the radio base station 1 that has a smaller number of heavy-load terminals connected thereto). The overall throughput of the radio LAN 10 is improved.

After the commencement of practical communication between the thus-selected radio base station 1 and the terminal station 2, the state of load on the radio LAN 10 managed by the radio base station 1 (i.e., the number of occurrences of collision/contention per unit time) may be changed, or the required throughput may be changed during the course of communication as a result of alteration of the application of the terminal station 2. As a result, the radio base station 1 connected to the terminal station 2 will fail to satisfy the throughput required for the terminal station 2.

In this case, according to the present embodiment, the terminal station 2 repeats the procedure of FIG. 8 from the transmission of a probe signal and automatically re-selects and is switched to another radio base station 1 whose load state is optimum. As a result, the throughput required for the radio base station can be ensured every time a variation arises in the state of load and the required throughput. If a large amount of throughput is not required, unnecessary throughput can be released.

Therefore, if there are a plurality of radio base stations 1 connectable with the terminal station 2 as shown in FIG. 3, the terminal station 2 selects a radio base station 1 capable of providing throughput required for the terminal station 2 from among the radio base stations 1 that have sent the state of load and is connected to the thus-selected radio base station 1. Consequently, the required throughput can be ensured, and the appropriate distribution of load can be implemented, which in turn enables considerable improvements in the overall throughput of the radio LAN 10 and better system operation.

[4] Changing of Contention Window Value

In the present embodiment, the maximum throughput is ensured within a single radio LAN 10 by changing the CW value to be described in section [4] and the addition of RTS/CTS frame and the maximum packet length to be described in section [5].

First, the changing of the CW value performed in the radio base station 1 of the present embodiment will be described in accordance with a flowchart (steps S31 to S38) shown in FIG. 9.

While the radio base station 1 of the embodiment is in operation, the byte counter 63 counts the number of bytes transmitted or received per unit time by the radio base station 1 (step S31). The retransmission counter 64 counts the number of times the radio base station 1 has attempted retransmission to the terminal station 2 per unit time (i.e., the number of occurrences of collision) (step S32). The terminal retransmission counter 65 counts the number of times the terminal station 2 has attempted retransmission of a frame (i.e., the terminal station 2 notifies the radio base station 1 of the number of attempts of retransmission by setting information about the number of attempts of retransmission into the frame to be retransmitted.) (step S33).

The CW value setting section 67 determines whether or not the transmission path is crowded, on the basis of the count values obtained from the counters 63 to 65 and changes the CW value.

First, it is determined whether or not the number of attempts of retransmission which is counted by the retransmission counter 64 is in excess of a threshold value (step S34). If the number of attempts of retransmission is in excess of the threshold value (YES), the CW value is set to a large value. The thus-changed value is then notified to the terminal station 2 by way of the synchronization frame signal (step S35).

If the number of attempts of retransmission is not in excess of the threshold value (NO in step S34), it is determined whether or not the number of times the terminal station 2 has attempted retransmission is in excess of the threshold value (step S36). If the number of attempts of retransmission is in excess of the threshold value (YES), the CW value is changed to a larger value. The thus-changed value is notified to the terminal station 2 by way of the synchronization frame signal (step S35).

If the number of attempts of retransmission received from the terminal station 2 is not in excess of the threshold value (NO in step S36), it is determined whether or not the number of bytes to be transmitted or received bytes is smaller than a threshold value (step S37). If the number of bytes to be transmitted or received bytes is smaller than the threshold value (YES), it is considered that the transmission path is not crowded. Therefore, the CW value is set to a small value, and the thus-changed value is notified to the terminal station 2 by way of the synchronization frame signal (step S38). If NO in step S37 (i.e., if the number of bytes to be transmitted or received bytes is greater than the threshold value), the processing will be terminated without changing the CW value.

Through the repetition of the foregoing processing, if the CW value setting section 67 has decided that the transmission path is crowded, the CW value setting section 67 sends a notification to the terminal station 2 so as to increase the initial CW value corresponding to back-off time which is set when data are retransmitted, by way of the periodically transmitted synchronization frame signal. As a result, the chance of collision between synchronization frame signals is reduced, thereby enabling improvements in the reduced throughput. Subsequently, the number of bytes to be transmitted or received bytes and the number of attempts of retransmission is monitored, and if it is decided that the transmission path becomes open (YES in step S37), the mean frame interval is reduced by resetting the CW value to the original value, enabling recovery to the initial throughput.

As described above, frame intervals that can reduce collision can be set by dynamically changing the CW value in accordance with the number of bytes to be transmitted or received bytes or the number of attempts of retransmission. As a result, data can be efficiently transmitted or received according to the state of load, which allows the radio LAN 10 in operation to provide its maximum throughput.

[5] Addition of RTS/CTS Frames and Changing of the Maximum Packet Length

Addition of RTS/CTS frames and changing of the maximum packet length performed in the radio base station 1 of the present embodiment will be described in accordance with a flowchart (steps S41 to S52) illustrated in FIG. 10.

As in the case with the changing of the CW value previously described with reference to FIG. 9, the RTS/CTS-addition-and-packet-length-setting section 68 of the present embodiment controls losses due to collision and losses due to the lengths of the RTS/CTS frames by dynamically changing the state of addition of the RTS/CTS frame and the maximum packet length when frame signals are transmitted, in accordance with the degree of the load (retransmission/ number of received frames) whereby the maximum throughput is ensured in the single radio LAN 10.

As illustrated in FIG. 10, the RTS/CTS-addition-and-packet-length-setting section 68 determines whether or not retransmission is performed with the help of the retransmission counter 64 and the terminal retransmission counter 65 (step S41). If there is retransmission (YES), the RTS/CTS-addition-and-packet-length-setting section 68 determines whether or not the RTS/CTS frame is added to the frame currently being retransmitted (step S42).

If the RTS/CTS frame is not used (NO in step S42), the counter 66 counts the mean frame length of the data (step S43). The thus-obtained mean data frame length and the rate of occurrence of retransmission which is obtained from the result of the counting performed by the retransmission counter 64 and the terminal retransmission counter 65, are subjected to determination (step S44). It is then decided whether or not the RTSICTS frame is to be used for frame transmission (step S45).

In step S45, on the basis of the rate of occurrence of retransmission and the mean data frame length, it is decided whether or not the transmission performance of the radio LAN is improved by addition of the RTS/CTS frame for frame transmission. On the basis of the result of such determination, it is decided whether or not the RTS/CTS frame is to be used. A criterion for determination of the transmission performance of the radio LAN 10 will be described with reference to FIG. 11.

Figure 11:
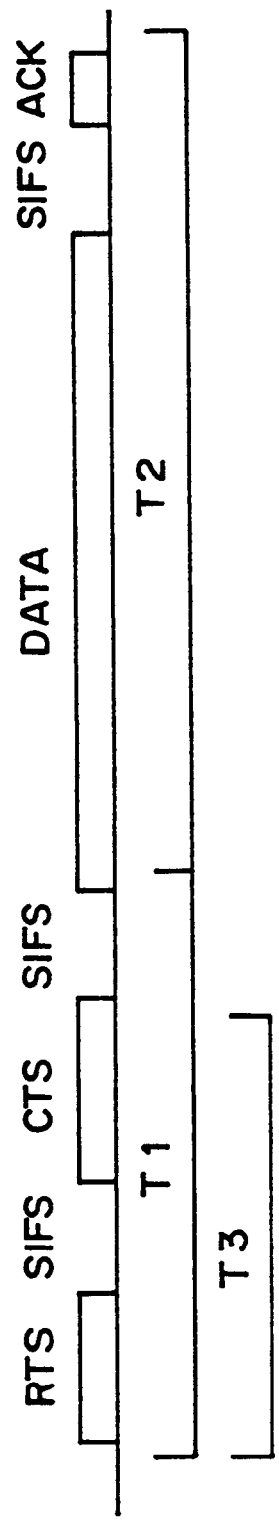
FIG. 11 is a schematic representation illustrating the operation of the radio base station (the criterion of addition of RTS/CTS) according to the embodiment.
Figure 12:
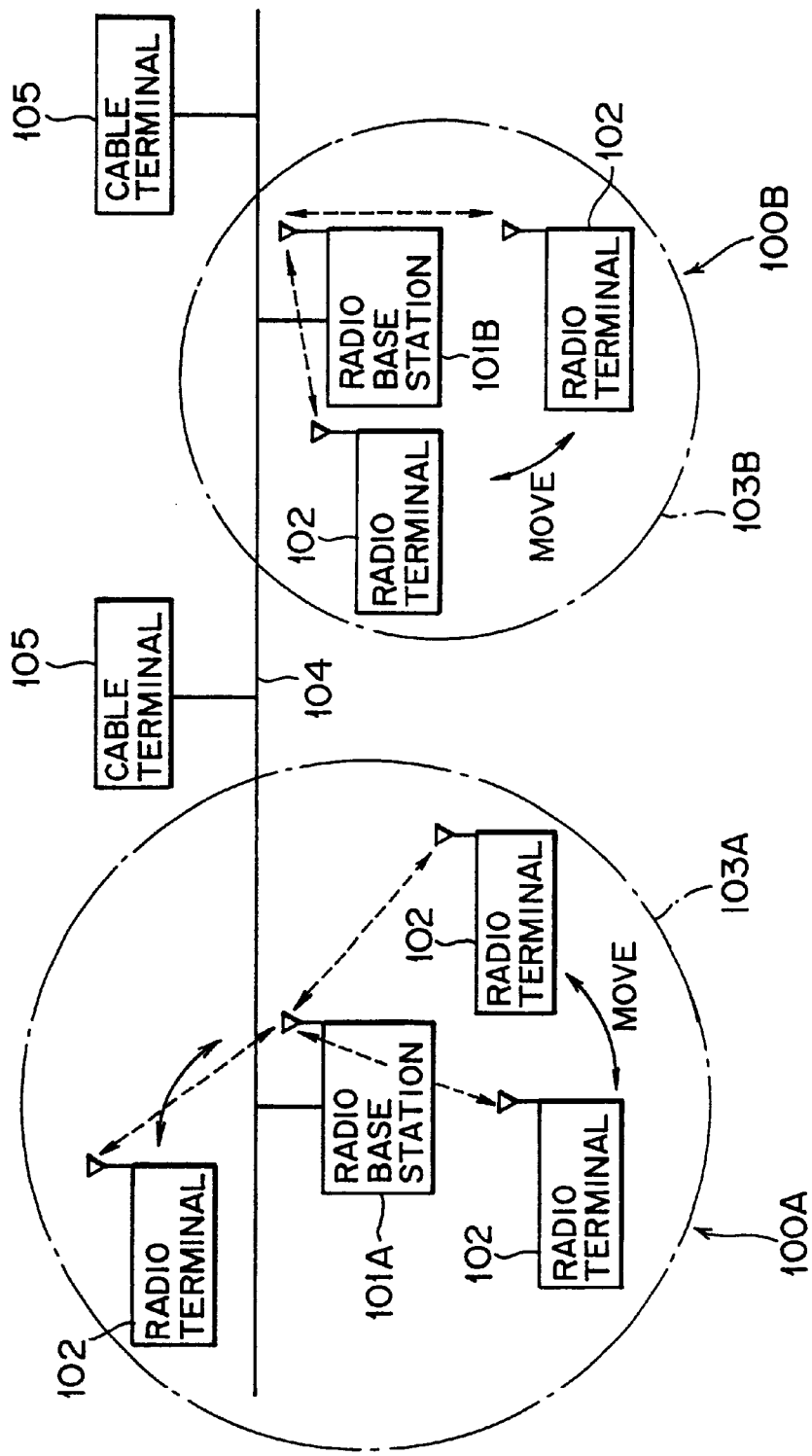
FIG. 12 is a block diagram illustrating a communications system to which a radio LAN is applied.
Figure 13:
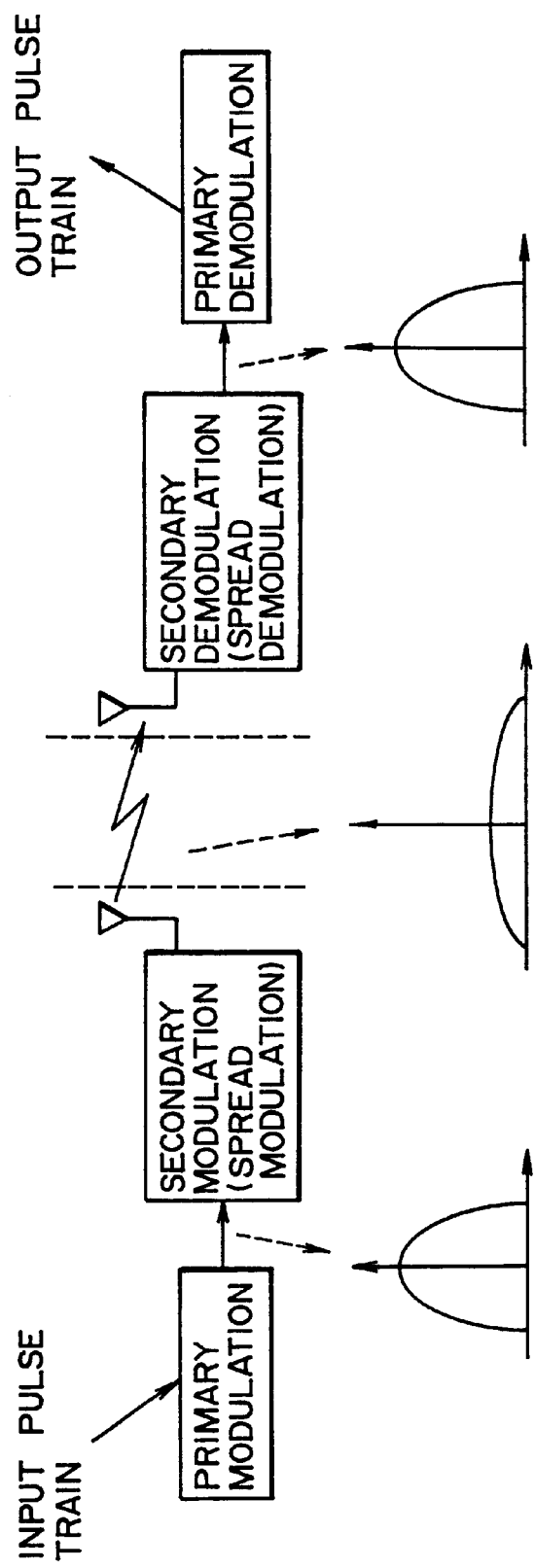
FIG. 13 is a diagram for explaining a spread spectrum scheme.
Figure 14:
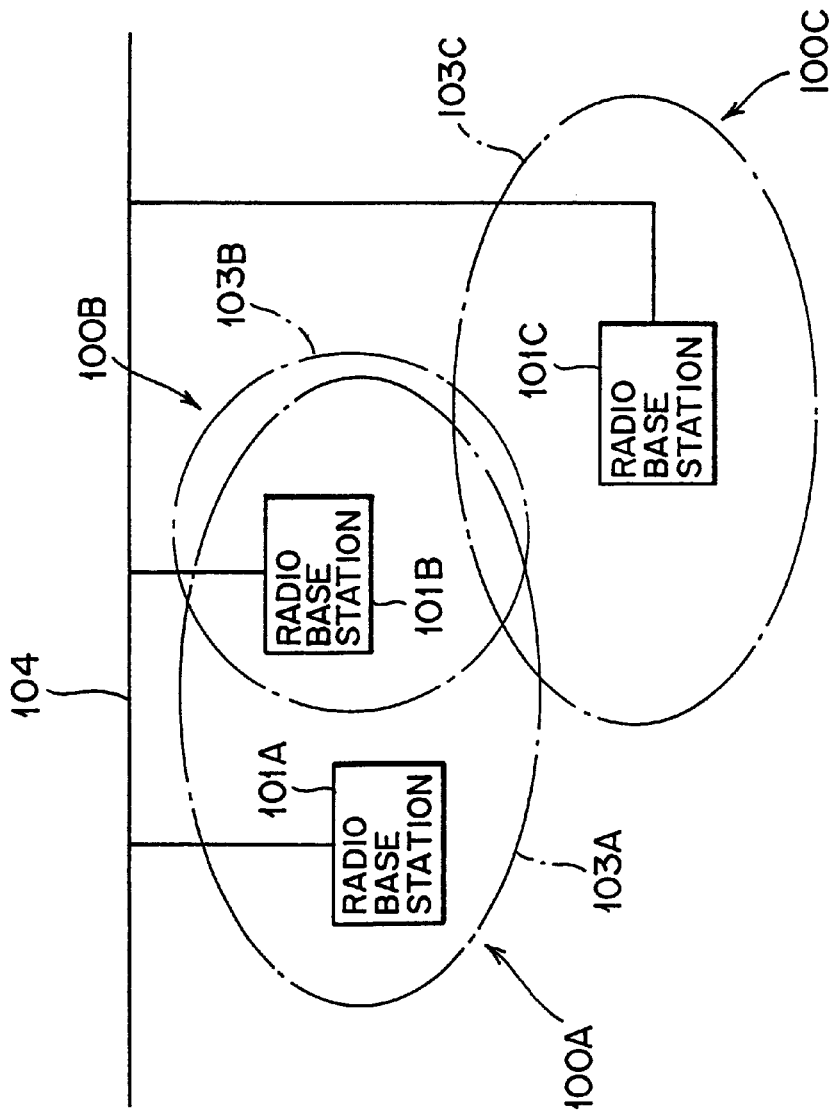
FIG. 14 is a block diagram illustrating an example of a plurality of radio LANs having overlapping radio areas.

FIG. 11 shows the relationship between the presence/ absence of the RTS/CTS frame and the length of data to be transmitted. In FIG. 11, T1 is the time required to exchange an RTS frame and a CTS frame; and T2 is time required to transmit a data frame. When the RTS/CTS frame is not used, collision is detected in T2. When the RTS/CTS frame is used, collision is detected in T3. SIFS denotes short interframe space, and ACK denotes an acknowledgment signal.

Provided that the number of times collision arises when transmitting one frame as illustrated in FIG. 11 is N, mean time required for transmission of one frame without use of the RTS/CTS frame becomes (N+1)×T2. In contrast, mean time required for transmission of one frame through use of the RTS/CTS frame becomes N×T3+(T1+T2).

Therefore, provided that the number of times retransmission is performed when transmitting one frame is N, the transmission performance of the radio LAN 10 is improved through use of the RTS/CTS frame when N×T3+(T1+T2)<(N+1)×T2; namely, (T2−T3)×N >T1 where T1 and T3 designate fixed values.

If it is decided in step S45 on the basis of the foregoing criterion that the transmission performance is improved through use of the RTS/CTS frame (YES), the RTS/CTS frame is used when transmitting data. The use of the RTS/CTS frame is notified to each of the terminal station 2 by way of the synchronization frame signal (step S46).

If it is decided in step S45 that it is better to avoid the use of the RTS/CTS frame (NO), it is then decided whether or not the data are now being transmitted while being in fragments (step S47). If the data are in fragments (YES), it is decided whether or not it is better to use the RTS/CTS frame increase the maximum packet length (step S48).

If YES in step S48, the maximum packet length is set to a large length. and the RTS/CTS frame is used. The use of the RTS/CTS frame is then notified to each of the terminal station 2 by way of the synchronization frame signal (step S49).

If NO in step S47 or S48, the RTS/CTS frame is not used when transmitting data. This is then notified to each of the terminal station 2 by way of the synchronization frame signal (step S50).

In contrast, if it is decided in step S41 that there is no retransmission of the frame (NO), the processing then proceeds to previously-described step S47. If it is decided in step S42 that the RTS/CTS frame is used (YES), it is decided whether or not the data are sent while being in fragments (step S51).

If it is decided in step S51 that the data are transmitted while being in fragments (YES), the processing will soon be terminated without modifications. If it is decided in step S51 that the data are not transmitted while being in fragments (NO), the maximum packet length is reduced, and the reduction in the maximum packet length is notified to each of the terminal station 2 by way of the synchronization frame signal (step S52).

As has been described above, in the present embodiment, the use/nonuse of the RTS/CTS frame and the maximum packet length are dynamically changed so as to improve the transmission performance of the radio LAN on the basis of the rate of occurrence of retransmission and the mean data frame length. As a result, efficient transmission/receipt of data corresponding to the state of load on the radio LAN 10 becomes possible, allowing the radio LAN 10 in operation to provide its maximum throughput.

Although the previous embodiment has been described with reference to a case where the radiocommunication network is a radio LAN, the present invention is not limited to this embodiment. The present invention is similarly applied to another radiocommunication network and provides the same operation and effects as provided in the previous embodiment.

What is claimed is:

1. A base station apparatus for a radiocommunication network in which radiocommunication with one or more radio terminal apparatuses is established according to a frequency hopping scheme, said base station apparatus comprising:

(I) a transmission/reception section for interfacing a radio signal inputted to/outputted from said base station apparatus via radio;

(II) a search section for obtaining a first pattern of the frequency hopping scheme, which is included in the radio signal, used in a vicinity of another radiocommunication network via a probe response signal reception section; and (III) a frequency hopping selection/setting section for setting, as an own pattern of the frequency hopping of said base station apparatus, a second pattern of the frequency hopping scheme which is identical with the obtained first pattern of the frequency hopping scheme of the another radiocommunication network and which is different in hopping timing from the obtained first pattern of the frequency hopping scheme of the another radiocommunication network.

2. The base station apparatus for radiocommunication network according to claim 1, further comprising a timing adjustment section which, during the course of ordinary operation, adjusts the hopping timing of the second pattern of the frequency hopping scheme of said base station apparatus relative to the hopping timing of the first pattern of the frequency hopping scheme of the another communications network.

3. A method of controlling communication across a radiocommunication network which includes one or more radio terminal apparatuses and a base station apparatus which establishes communication with the radio terminal apparatus according to a frequency hopping scheme, wherein said base station apparatus searches for another radiocommunication network in the vicinity of said base station apparatus when said base station apparatus is started; and when said another radiocommunication network is detected, said base station apparatus obtains a first pattern of the frequency hopping scheme of said another radiocommunication network, selects a second pattern of the frequency hopping scheme which is the same as the obtained first pattern of said another radiocommunication network and carries out frequency hopping of the selected second pattern at a hopping timing different from a hopping timing of the obtained first pattern of said another radiocommunication network.

4. The method of controlling communication across a radiocommunication network according to claim 3, wherein said base station apparatus, during the course of ordinary operation, adjusts the hopping timing of the frequency hopping of the selected second pattern of said base station apparatus relative to the hopping timing of the frequency hopping the obtained first pattern performed in said another communications network.

* * * * *